US011331795B2

(12) United States Patent
Obayashi et al.

(10) Patent No.: US 11,331,795 B2
(45) Date of Patent: May 17, 2022

(54) ARTICLE GRIPPING DEVICE

(71) Applicant: ISHIDA CO., LTD., Kyoto (JP)

(72) Inventors: Yujiro Obayashi, Ritto (JP); Shuichi Maeda, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/944,090

(22) Filed: Jul. 30, 2020

(65) Prior Publication Data
US 2021/0039252 A1 Feb. 11, 2021

(30) Foreign Application Priority Data

Aug. 5, 2019 (JP) .............................. JP2019-143734

(51) Int. Cl.
*B25J 9/16* (2006.01)
*B25J 15/10* (2006.01)
(Continued)

(52) U.S. Cl.
CPC ......... *B25J 9/1612* (2013.01); *B25J 15/0057* (2013.01); *B25J 15/103* (2013.01); *B25J 19/0058* (2013.01)

(58) Field of Classification Search
CPC .... B25J 15/0052; B25J 15/103; B25J 9/1612; B25J 11/0045; B25J 19/0058; B65G 47/905; B65G 47/907; B65G 45/105
See application file for complete search history.

(56) References Cited

U.S. PATENT DOCUMENTS 4,416,577 A * 11/1983 Inaba ................... B23Q 11/005
414/225.01
5,321,212 A   6/1994 Wadell
(Continued)

FOREIGN PATENT DOCUMENTS

CN    109909993 A  *  6/2019
JP    H063182 A       1/1994
(Continued)

OTHER PUBLICATIONS

The extended European search report dated Dec. 18, 2020.

*Primary Examiner* — Dean J Kramer
(74) *Attorney, Agent, or Firm* — Global IP Counselors, LLP

(57) ABSTRACT

An article gripping device causes a gripping member to grip an article, and subsequently discharge the article by releasing the gripping of the article by the gripping member. The article gripping device is provided with a gripping member driving mechanism to drive the gripping member, and a controller to control the gripping member driving mechanism. The controller has, as control modes for the gripping member driving mechanism, a first control mode and a second control mode that is separate from the first control mode. In the first control mode, the controller controls the gripping member driving mechanism to cause the gripping member to execute a first operation of gripping the article and subsequently releasing the gripping of the article. In the second control mode, the controller controls the gripping member driving mechanism to cause the gripping member to execute a second operation of removing matter adhering to the gripping member.

10 Claims, 19 Drawing Sheets

(51) Int. Cl.
*B25J 19/00* (2006.01)
*B25J 15/00* (2006.01)

(56) References Cited

U.S. PATENT DOCUMENTS

| | | | |
|---|---|---|---|
| 7,083,208 B2 * | 8/2006 | Ilich | A01K 45/007 294/64.2 |
| 8,162,366 B1 * | 4/2012 | Tan | B25J 15/10 294/194 |
| 2018/0059083 A1 | 3/2018 | Leslie | |

FOREIGN PATENT DOCUMENTS

| | | |
|---|---|---|
| JP | 2013136107 A | 7/2013 |
| WO | 2011152520 A1 | 12/2011 |
| WO | 2018169043 A1 | 9/2018 |

* cited by examiner

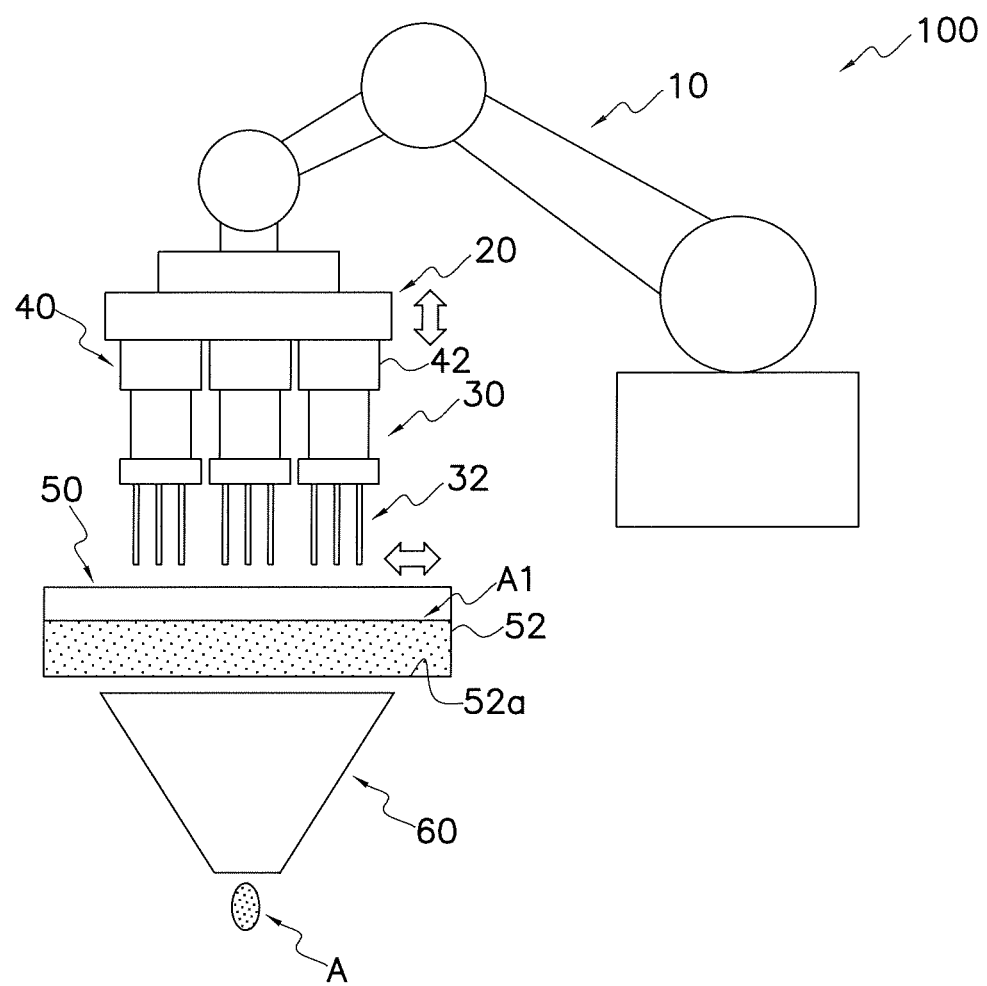
F I G. 1

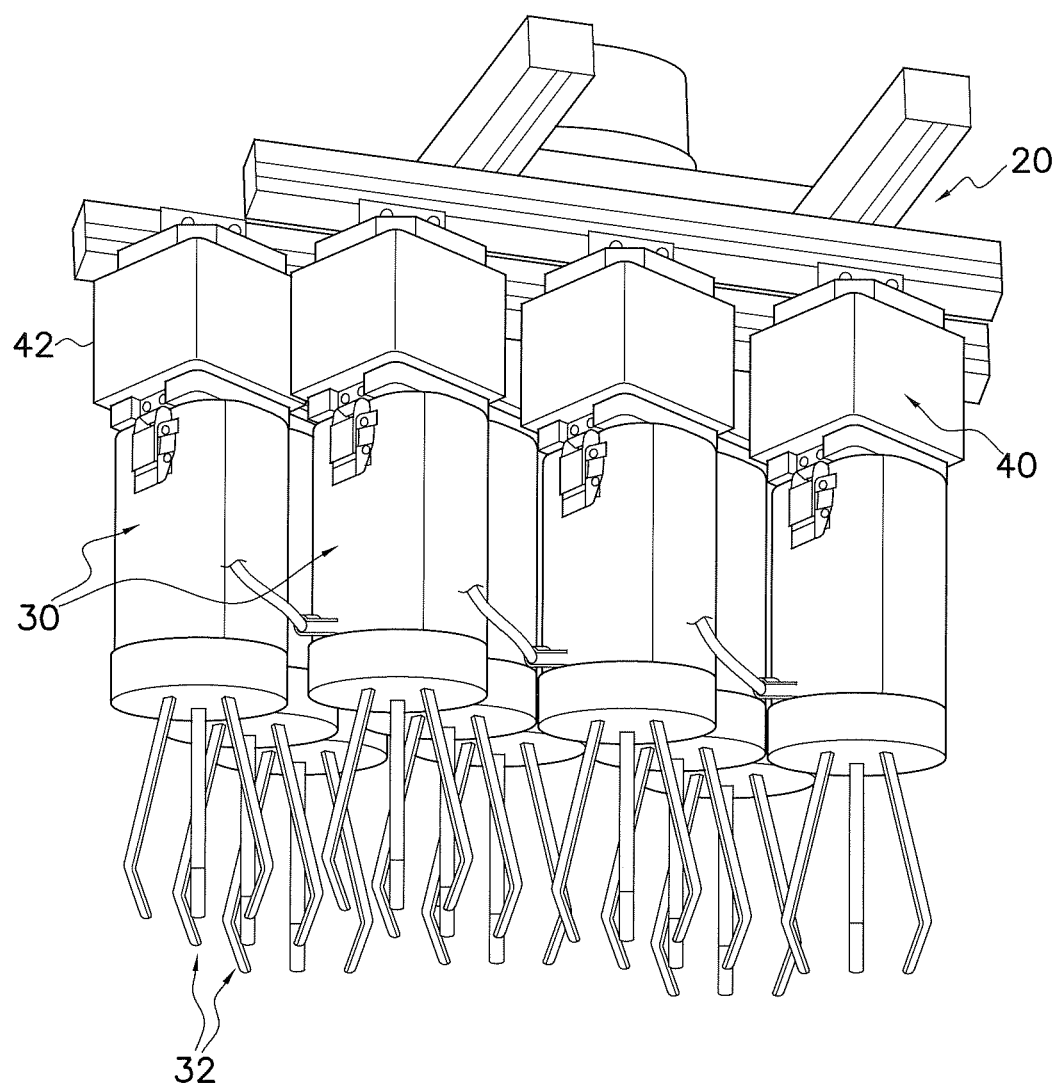
F I G. 4

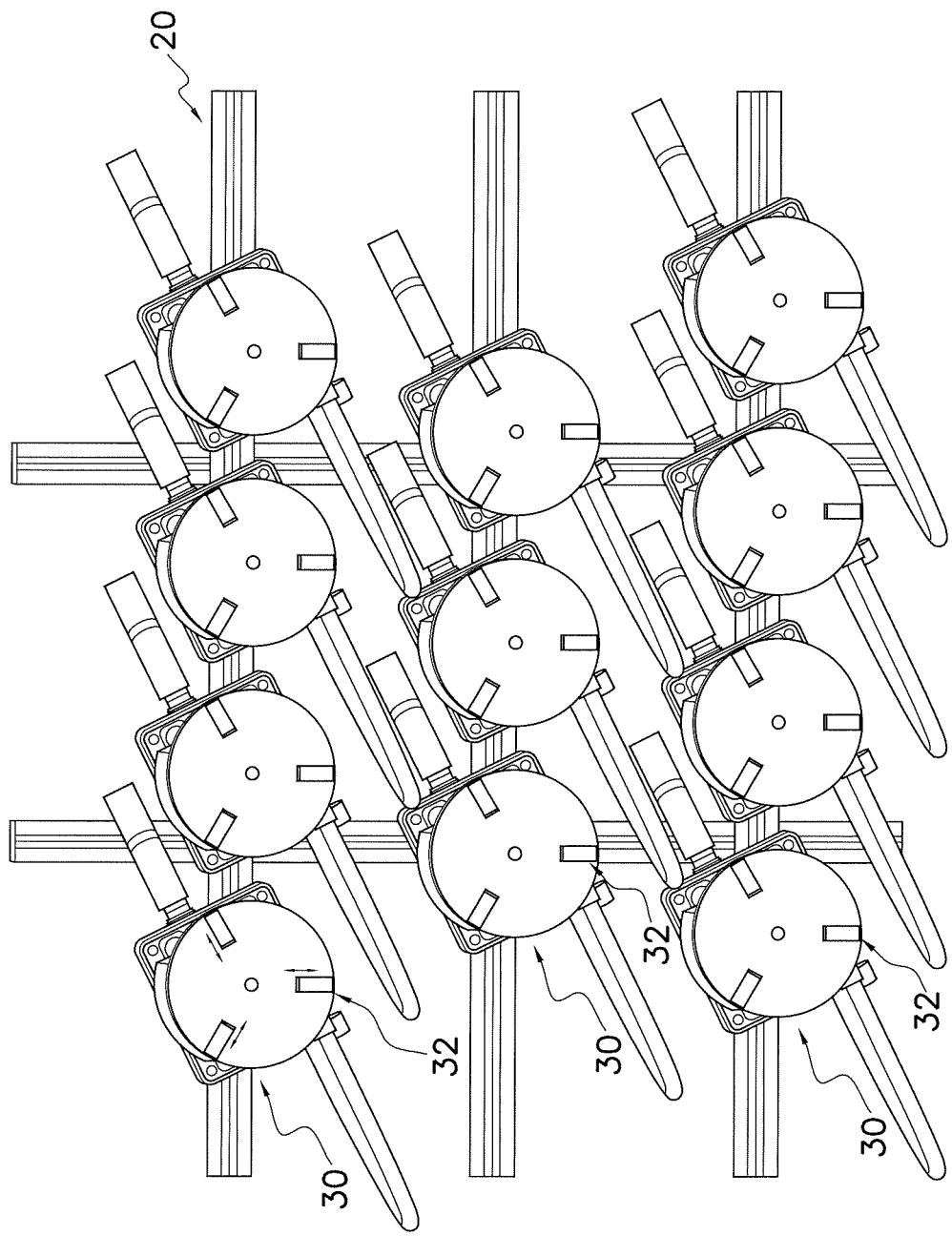

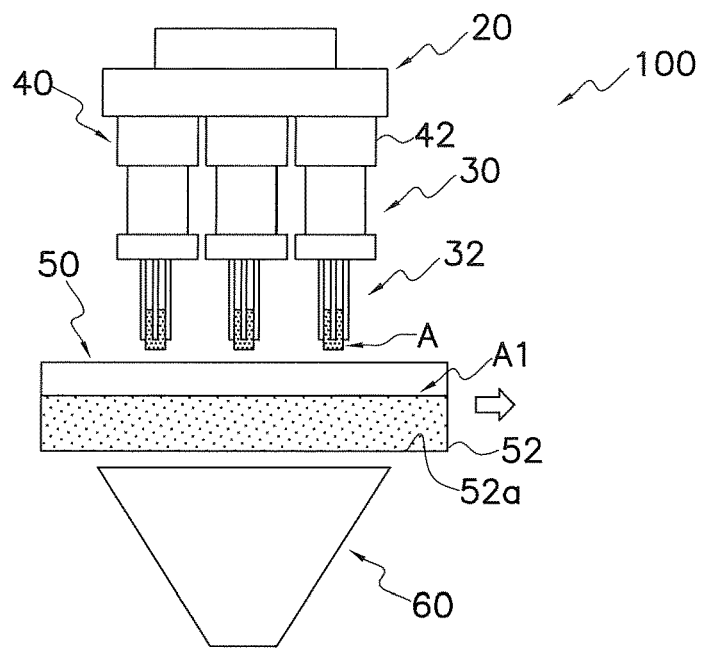
F I G. 6 C
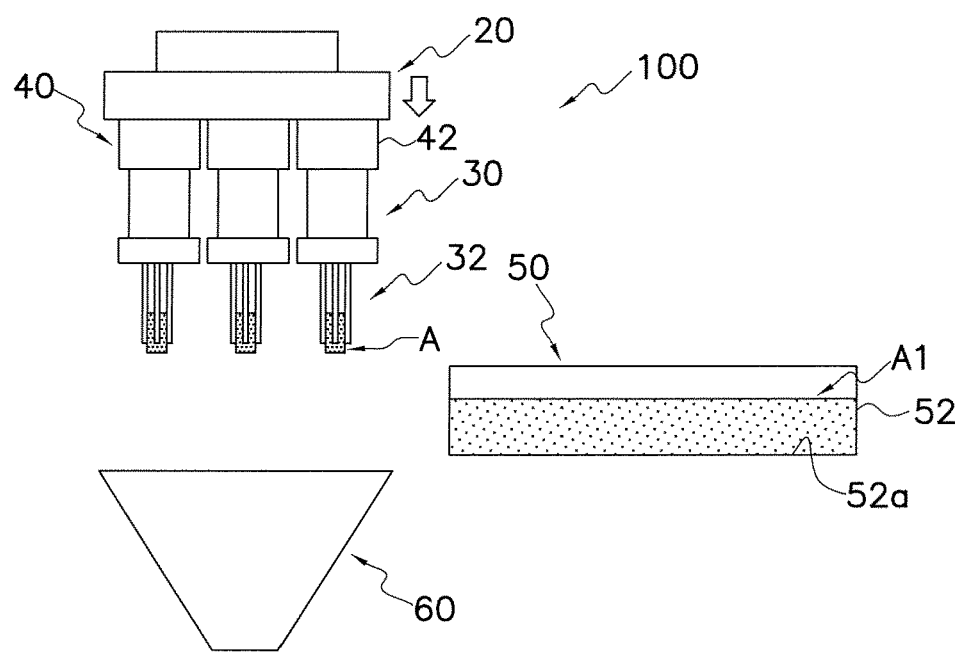
F I G. 6 D

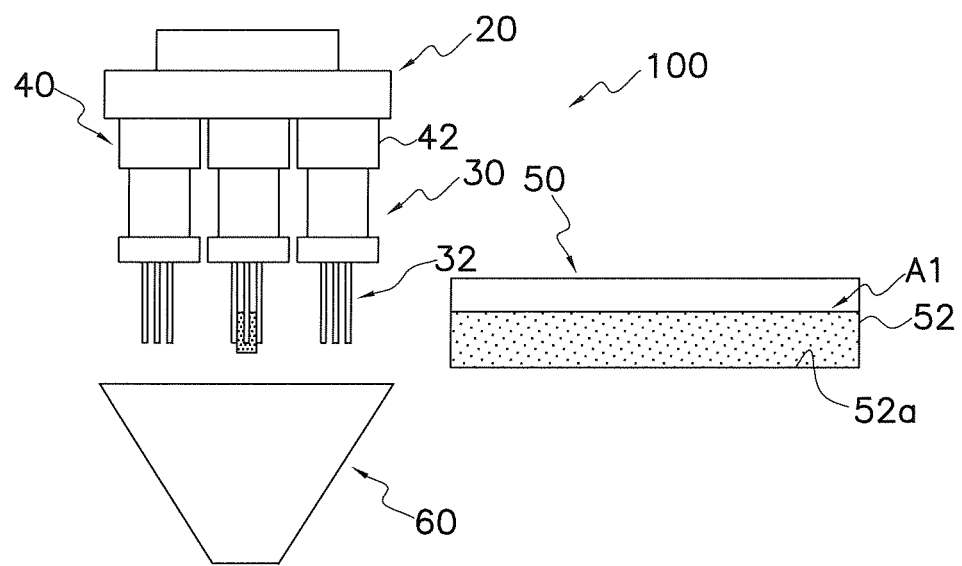
F I G. 6 G
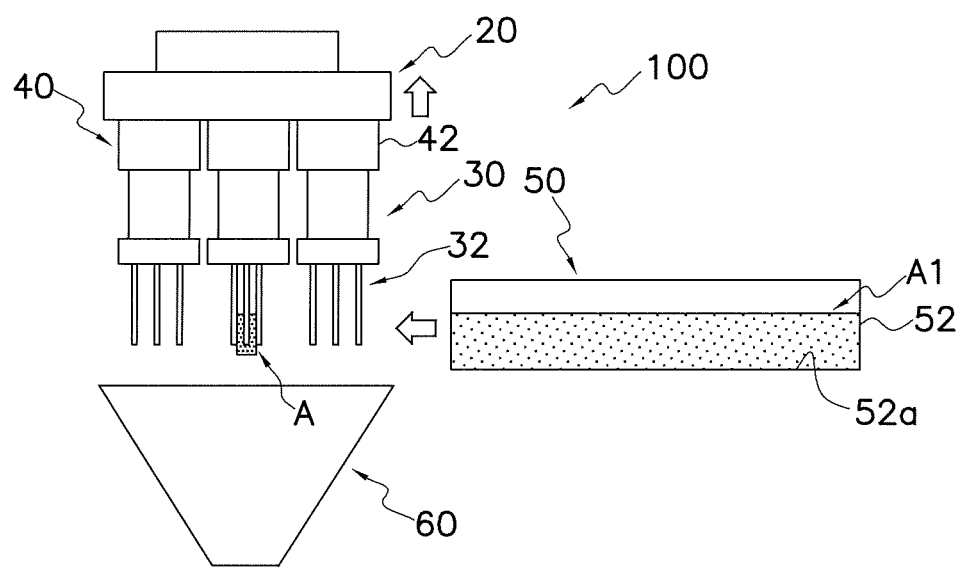
F I G. 6 H

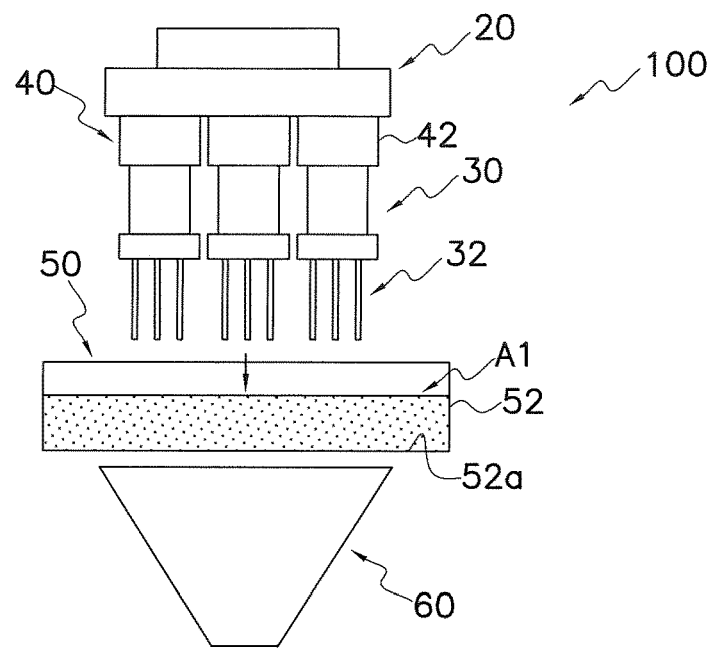
F I G. 6 I
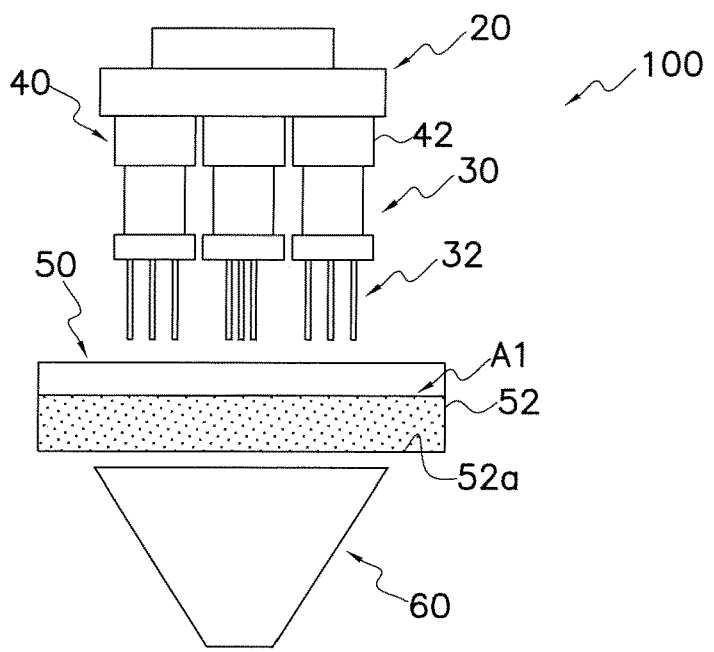
F I G. 6 J

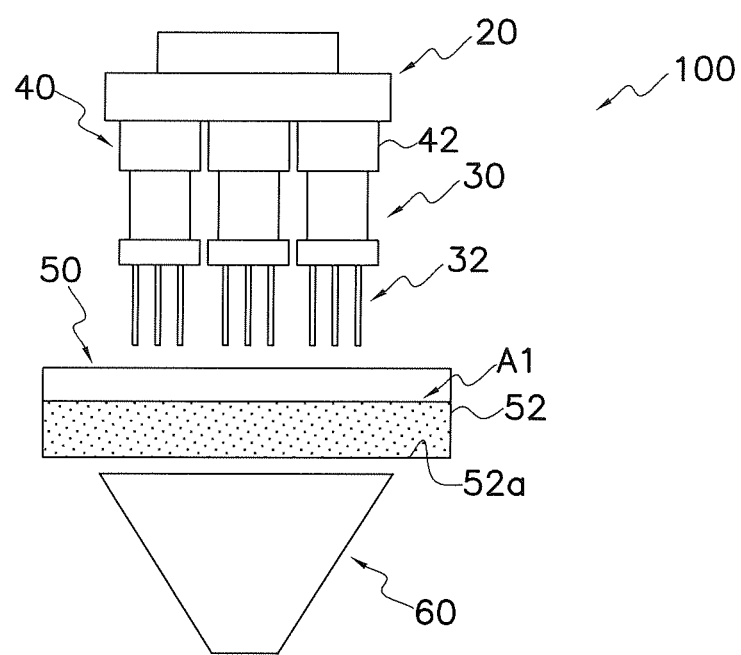
F I G. 6 K

ARTICLE GRIPPING DEVICE

CROSS-REFERENCE TO RELATED APPLICATION

This application claims priority to Japanese Patent Application No. 2019-143734, filed Aug. 5, 2019. The contents of that application are incorporated by reference herein in their entirety.

TECHNICAL FIELD

The present invention pertains to an article gripping device that causes a gripping member to grip an article, and subsequently causes the gripping member to release the gripping of the article to thereby discharge the article.

BACKGROUND ART

As presented in Japanese Laid-open Patent Publication No. H06-3182, an article gripping device that causes a gripping member to grip an article, and then discharges the article by causing the gripping member to release the gripping of the article is known.

SUMMARY OF THE INVENTION

Technical Problem

In such an article gripping device, depending on the article to be handled, there is a concern that the article itself and/or a sticky substance, etc., included in the article will adhere to the gripping member. Moreover, adhesion of such matter adhering or sticking to the gripping member for a long period of time can be unsanitary. Matter adhering to surfaces of a gripping member can be removed by stopping the device to enable an operator to perform maintenance. However, the rate of operation of a device is likely to decrease when the device is frequently stopped to perform such maintenance.

Thus, an object of the present invention is to provide an article gripping device which is sanitary, and in which prolonged adhesion of matter adhering to a gripping member is easily reduced without stopping the device for maintenance.

Solution to Problem

An article gripping device according to a first aspect causes a gripping member to grip an article, and subsequently discharges the article by causing the gripping member to release the gripping of the article. The article gripping device is provided with a driving mechanism and a controller. The driving mechanism drives the gripping member. The controller controls the driving mechanism. The controller has, as control modes for the driving mechanism, a first control mode and a second control mode that is separate from the first control mode. In the first control mode, the controller controls the driving mechanism to cause the gripping member to execute a first operation of gripping an article and subsequently releasing the gripping of the article. In the second control mode, the controller controls the driving mechanism to cause the gripping member to execute a second operation of removing matter adhering to the gripping member.

In the article gripping device of the first aspect, the second operation of the gripping member reduces the occurrence of a state in which matter that remains adhered to the gripping member, without stopping the device for maintenance, and thus the article gripping device is sanitary.

Here, a driving mechanism that causes the gripping member to grip the article and release gripping of the article is also used to cause the gripping member to execute the second operation. Therefore, in this article gripping device, the number of components can be reduced, and, the device can be simplified relative to a case in which a separate mechanism is provided to cause the gripping member to execute the second operation.

An article gripping device according to a second aspect is the article gripping device of the first aspect and is further provided with a weight acquisition unit. The weight acquisition unit acquires a weight value of the article gripped by the gripping member.

In the article gripping device of the second aspect, a state in which an article is kept to be adhered to the gripping member and/or a state in which an article adhering to the gripping member is dropped at an unintended timing is not prone to occur. Therefore, in the article gripping device of the second aspect, when the weight value of the article gripped by the gripping member is acquired and the article for which the weight value has been acquired is to be discharged, a deviation between the weight of the article to be discharged and the weight value acquired by the weight acquisition unit is likely to be reduced.

An article gripping device according to a third aspect is the article gripping device of the first aspect or the second aspect, wherein the second operation is an operation that differs from the first operation.

In the article gripping device of the third aspect, the gripping member performs a second operation that differs from the normal first operation and is suited for removal of matter adhering to the gripping member, and removal of such matter adhering to the gripping member can be thereby facilitated.

An article gripping device according to a fourth aspect is the article gripping device of the third aspect, wherein an average operating speed of the gripping member during the second operation is greater than the average operating speed of the gripping member during the first operation.

In the article gripping device of the fourth aspect, the gripping member performs a second operation having a higher speed than the normal first operation, and removal of matter adhering to the gripping member can be thereby facilitated.

An article gripping device according to a fifth aspect is the article gripping device according to any one of the first to fourth aspects, wherein the controller controls the driving mechanism in the second control mode immediately after causing the gripping member to release the gripping of the article in the first operation.

In the article gripping device of the fifth aspect, the gripping member performs the second operation immediately after gripping of an article is released, and therefore all or a majority of the articles gripped by the gripping member are easily discharged.

An article gripping device according to a sixth aspect is the article gripping device according to any one of the first to fourth aspects, wherein the controller controls the driving mechanism in the second control mode before causing the gripping member to grip the article in the first operation.

In the article gripping device of the sixth aspect, the gripping member performs the second operation before gripping an article, and therefore matter adhering to the gripping member can be removed or reduced before the article is gripped.

An article gripping device according to a seventh aspect is the article gripping device according to any one of the first to sixth aspects, wherein the controller periodically executes control of the driving mechanism in the second control mode.

In the article gripping device of the seventh aspect, the second control mode is periodically executed, and therefore prolonged adhesion of matter to the gripping member is reduced, and the article gripping device is sanitary.

An article gripping device according to an eighth aspect is the article gripping device according to any one of the first to seventh aspects and is further provided with a storage container in which a cleaning liquid is stored. The second operation of the gripping member is executed with the gripping member at least partially inserted into the liquid inside the storage container.

In the article gripping device of the eighth aspect, the second operation is executed with the gripping member inserted into a cleaning liquid such as water, and removal of matter from the gripping member can be therefore facilitated.

Advantageous Effects of Invention

In the article gripping device according to the present invention, a state in which matter remains adhered to the gripping member is suppressed without stopping the device for maintenance, and thus the article gripping device is sanitary.

BRIEF DESCRIPTION OF THE DRAWINGS

FIG. 1 is a schematic view of an article gripping device according to an embodiment of the present invention.

FIG. 4 is a schematic perspective view of the movable member, weight acquisition units and grippers of the article gripping device of FIG. 1.

FIG. 5A is a bottom view in which the movable member to which the grippers of the article gripping device of FIG. 1 are attached is viewed from the gripping member side of the grippers.

FIG. 6C is a schematic side view of the main portion of the article gripping device of FIG. 1, for explaining the operation of the article gripping device, and depicts a state in which the gripping members of the grippers that have gripped articles have been moved to outside of an article group accommodation container.

FIG. 6D is a schematic side view of the main portion of the article gripping device of FIG. 1, for explaining the operation of the article gripping device, and depicts a state in which a loading unit has been moved to a second position.

FIG. 6G is a schematic side view of the main portion of the article gripping device of FIG. 1, for explaining the operation of the article gripping device, and depicts a portion of a second operation by some of the gripping members.

FIG. 6H is a schematic side view of the main portion of the article gripping device of FIG. 1, for explaining the operation of the article gripping device, and depicts a portion of the second operation by some of the gripping members.

FIG. 6I is a schematic side view of the main portion of the article gripping device of FIG. 1, for explaining the operation of the article gripping device, and depicts a state in which grippers corresponding to a weight value not selected for a combination have dropped articles into the article group accommodation container.

FIG. 6J is a schematic side view of the main portion of the article gripping device of FIG. 1, for explaining the operation of the article gripping device, and depicts a portion of the second operation by some of the gripping members.

FIG. 6K is a schematic side view of the main portion of the article gripping device of FIG. 1, for explaining the operation of the article gripping device, and depicts a portion of the second operation by some of the gripping members.

DESCRIPTION OF EMBODIMENTS

An article gripping device 100 according to an embodiment of the present invention is described below.

(1) Overall Summary

Figure 2:
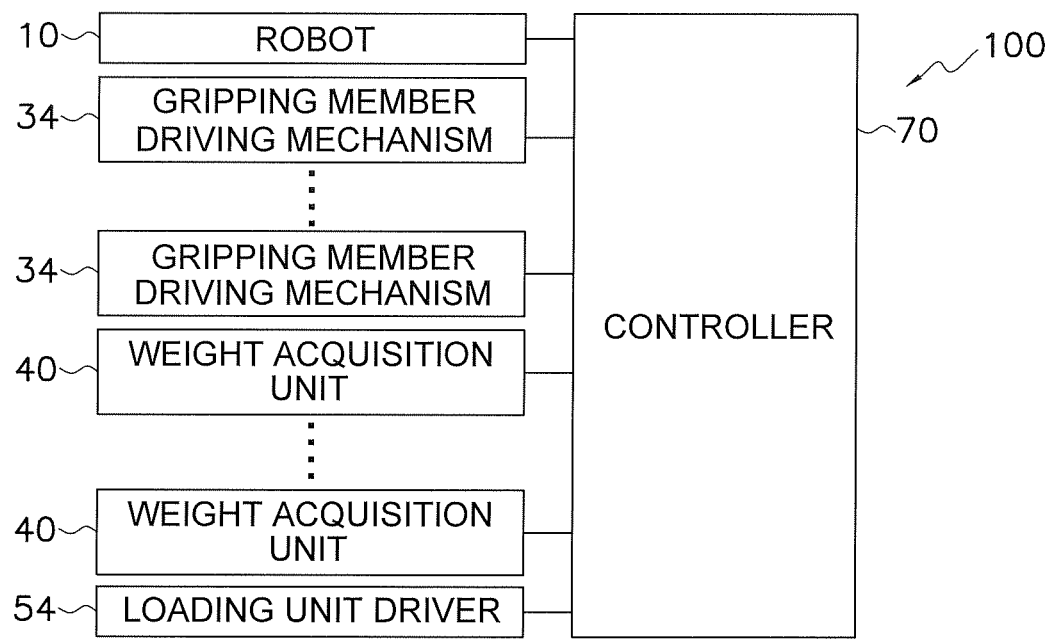
FIG. 2 is a block diagram of the article gripping device of FIG. 1.

A summary of the article gripping device 100 will be described with reference to FIGS. 1 and 2. FIG. 1 is a schematic view of the article gripping device 100. FIG. 2 is a block diagram of the article gripping device 100.

The article gripping device 100 extracts some articles A from an article group A1, which is a collection of articles A, and discharges them. Specifically, the article gripping device 100 extracts some articles A from the article group A1 and discharges them, such that a discharged weight is within a target weight range. Although this configuration is not limiting, the articles A discharged by the article gripping device 100 are packaged in a bag or accommodated in a container, and shipped as goods in steps (not illustrated) following the article gripping device 100.

The article gripping device 100 is provided primarily with a robot 10, a movable member 20, a gripper 30, a weight acquisition unit 40, a loading unit 50, a loading unit driver 54, a discharge chute 60, and a controller 70 (see FIGS. 1 and 2). The controller 70 performs various calculations and controls the operation of each part of the article gripping device 100. A general description of the configuration of these constituent elements is given below.

The article group A1 is loaded into the loading unit 50. The article A is not limited, and may be a food product, for example. Moreover, while not limited, the article A may be, for example, spaghetti or other noodles, or a highly sticky food product such as a food product including a large amount of sugar. The loading unit 50 is moved, by the loading unit driver 54, between a first position at which the gripper 30 grips the article A of the article group A1 loaded into the loading unit 50, and a second position at which the gripper 30 does not grip the article A from the article group A1 loaded into the loading unit 50.

Each gripper 30 has a gripping member 32 for gripping the article A. The gripper 30 is attached to the movable member 20. In the present embodiment in particular, a plurality of grippers 30 are attached to the movable member 20. The robot 10 moves the movable member 20 to which the grippers 30 are attached. The weight acquisition unit 40 acquires a weight value of the articles A gripped by each gripper 30. The discharge chute 60 receives and discharges the articles A for which gripping by the grippers 30 has been released. For example, the controller 70 controls the operation of the various constituents of the article gripping device 100 including the loading unit driver 54, a gripping member driving mechanism 34 and the robot 10. For example, the controller 70 also performs a combination calculation, which utilizes the weight values of the articles A acquired by the weight acquisition units 40.

Following is a general description of the operation of the article gripping device 100. The controller 70 controls the operation of the robot 10 to move the movable member 20 and bring the grippers 30 close to the loading unit 50 placed at the first position and loaded with the article group A1. The controller 70 controls a gripping member driving mechanism 34 of each gripper 30, and causes the gripping members 32 of each gripper 30 to grip some of the articles A of the article group A1 loaded in the loading unit 50. Each weight acquisition unit 40 acquires a weight value of the articles A gripped by the gripper 30 corresponding to the weight acquisition unit 40 thereof. The controller 70 carries out a combination calculation on the basis of the weight values of the articles A gripped by the grippers 30, each weight value being acquired by the respective weight acquisition unit 40. The combination calculation is a process of finding a combination of weight values for which a total value thereof is within a target weight range when the weight values of the articles A gripped by each of the grippers 30 are added together. On the basis of the result of the combination calculation, the controller 70 causes the gripping members 32 of the grippers 30 corresponding to a combination of weight values that is in the target weight range to release gripping of the articles A from above the discharge chute 60 and thereby discharge the articles A of the target weight range from the discharge chute 60. A detailed description is given below.

(2) Detailed Configuration

Figure 3:
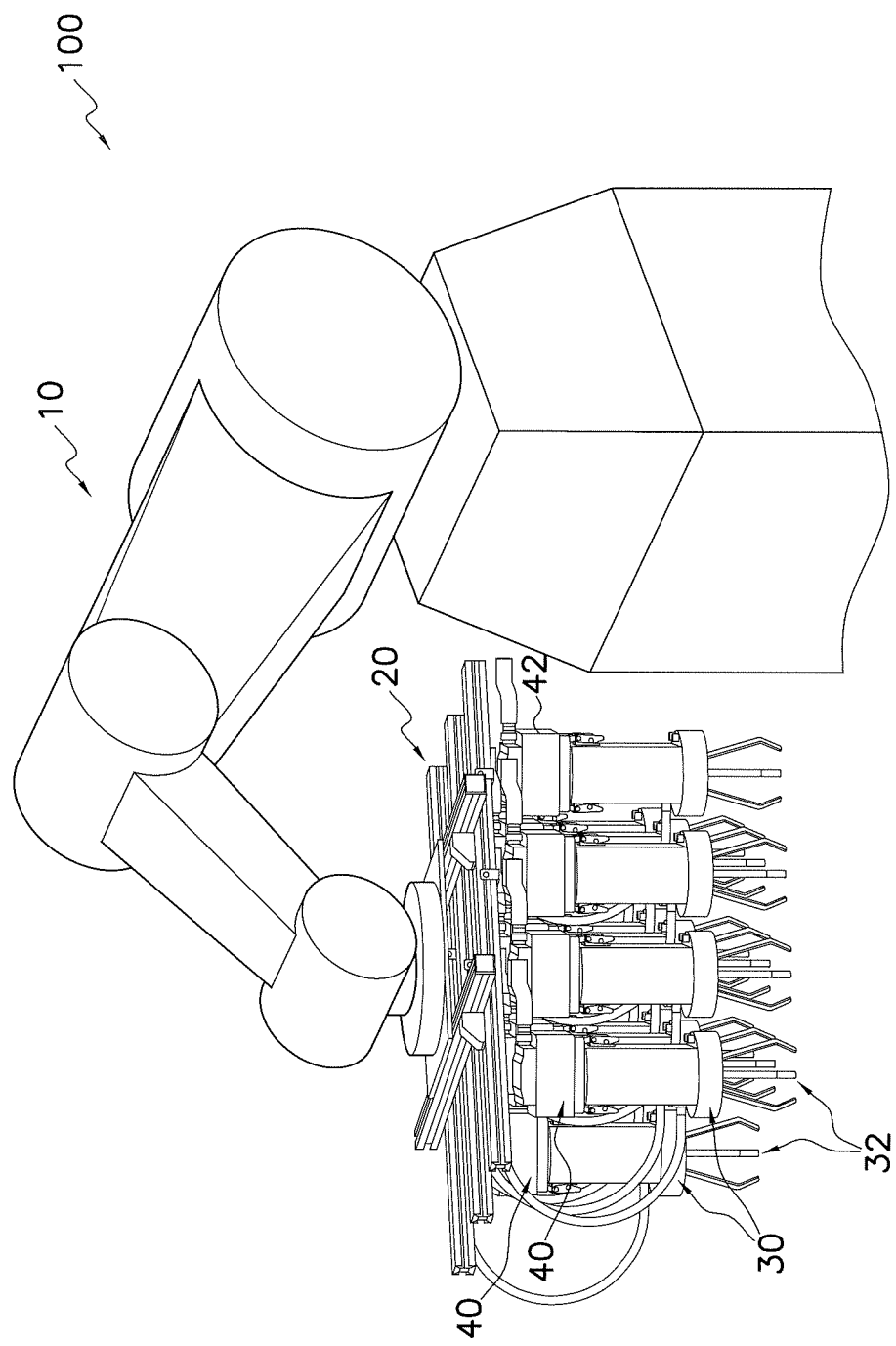
FIG. 3 is a schematic perspective view of a robot, a movable member, weight acquisition units and grippers of the article gripping device of FIG. 1.
Figure 5B:
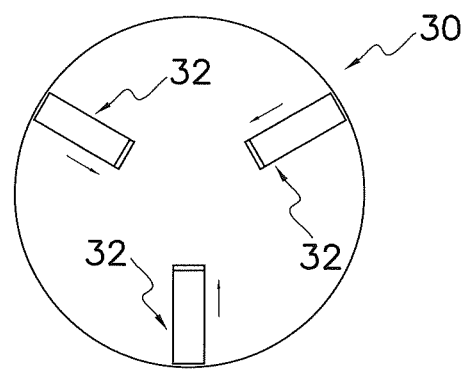
FIG. 5B is a bottom view of one gripper of FIG. 5A as viewed from below the gripping members of the one gripper, and depicts the gripping members positioned in distant positions in a state prior to gripping an article or after releasing the gripping of the article.
Figure 5C:
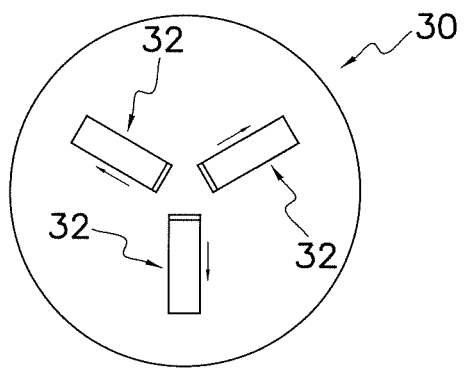
FIG. 5C is a bottom view of the one gripper of FIG. 5A as viewed from below the gripping members of the gripper, and depicts the gripping members positioned in close positions when gripping an article.

The detailed configuration of the article gripping device 100 will be described with reference primarily to FIGS. 1 to 5. FIG. 3 is schematic perspective view of the robot 10, the movable member 20, the weight acquisition units 40, and the grippers 30. FIG. 4 is a schematic perspective view of the movable member 20, the weight acquisition units 40 and the grippers 30. FIG. 5A is a bottom view in which the movable member 20 to which the grippers 30 are attached is viewed from the gripping member 32 side of the grippers 30 (from below). FIG. 5B is a bottom view of one gripper 30 of FIG. 5A as viewed from below the gripping members 32 of the one gripper 30, and depicts the gripping members 32 positioned in below-described distant positions. FIG. 5C is a bottom view of the one gripper 30 of FIG. 5A as viewed from below the gripping members 32 of the one gripper 30, and depicts the gripping members 32 positioned in below-described close positions.

(2-1) Movable Member

The movable member 20 is a member to which the gripper 30 is attached. In the present embodiment, a plurality of grippers 30 are attached to the movable member 20. The movable member 20 is a frame supporting the grippers 30. The movable member 20 is a member that can be moved, and is moved by the robot 10.

Herein, the statement that the gripper 30 is attached to the movable member 20 does not represent only an aspect in which the gripper 30 is directly attached to the movable member 20. Rather, the statement that the gripper 30 is attached to the movable member 20 also includes an aspect in which the gripper 30 is attached to the movable member 20 via another member. In the present embodiment, the gripper 30 is attached to the movable member 20 via a sensor unit 42 of the weight acquisition unit 40 (see FIG. 4).

(2-2) Robot

The robot 10 is a device that supports the movable member 20, and moves the movable member 20. In the present embodiment, the robot 10 moves the movable member 20 along a single axis. Specifically, the robot 10 moves the movable member 20 up and down along a single axis extending in a vertical direction.

In the present embodiment, the robot 10 is an articulated robot like that illustrated in FIG. 1. However, the type of the robot 10 is not limited to an articulated robot, and the robot 10 need only be a device that can move the movable member 20 in a prescribed direction.

Moreover, in place of the robot 10, the article gripping device 100 may have a cylinder that can move the movable member 20 in a prescribed direction. For example, the article gripping device 100 may have, in place of the robot 10, a cylinder that can move the movable member 20 along a single axis.

(2-3) Gripper

The gripper 30 is a device for gripping the article A.

Each gripper 30 has a gripping member 32, and a gripping member driving mechanism 34 as a driving mechanism for driving the gripping member 32. The gripping member driving mechanism 34 drives the gripping member 32 using, for example, a motor or fluid pressure device as a driver.

In the present embodiment, the gripping member 32 is a rod-shaped or finger-shaped member (see FIG. 4). Each gripper 30 has a plurality (three in FIG. 4) of gripping members 32. Note that the number and/or shape of the gripping members 32 depicted in FIG. 4, etc., are merely examples, and can be changed, as appropriate.

When each gripper 30 is viewed from the gripping member 32 side, in the present embodiment, the plurality of gripping members 32 are aligned and arranged in a circumferential direction of the gripper 30 (see FIG. 5A). In particular, here, when each gripper 30 is viewed from the gripping member 32 side, the plurality of gripping members 32 are aligned at generally equal intervals in the circumferential direction. The gripping members 32 can move in a radial direction of the gripper 30 when each gripper 30 is viewed from the gripping member 32 side (see FIG. 5A). The gripper 30 causes gripping members 32 in a mutually separated state (see FIG. 5B) to shift radially inward through use of the gripping member driving mechanism 34 so that the gripping members 32 are in a mutually close state (see FIG. 5C), and thereby holds an article A between a plurality of gripping members 32 to grip the article A. The gripper 30 releases the gripping of the article A by causing the gripping members 32 that are in the mutually close state (see FIG. 5C) to shift radially outward through use of the gripping member driving mechanism 34 so that the gripping members 32 are in a mutually separated state (see FIG. 5B).

As illustrated in FIGS. 3, 4 and 5A, a plurality of grippers 30 are attached to the movable member 20. Each gripper 30 is attached to the movable member 20 via a sensor unit 42 of the weight acquisition unit 40. In other words, the sensor unit 42 of the weight acquisition unit 40 is disposed between the gripper 30 and the movable member 20 supporting the gripper 30. The number of grippers 30 is not limited, but in the example illustrated in FIGS. 3, 4 and 5A, eleven grippers 30 are attached to the movable member 20. The robot 10 moves the movable member 20 up and down, and the plurality of grippers 30 attached to the movable member 20 are thereby integrally moved up and down.

When the grippers 30 attached to the movable member 20 are viewed from the gripping member 32 side (see FIG. 5A), each gripper 30 has a substantially circular shape. While not limited, in the present embodiment, when the grippers 30 attached to the movable member 20 are viewed from the gripping member 32 side, the grippers 30 are disposed in a generally staggered configuration.

(2-4) Weight Acquisition Unit

In the article gripping device 100, one weight acquisition unit 40 is provided for each gripper 30. The weight acquisition unit 40 acquires a weight value of an article A gripped by the gripping members 32 of the corresponding gripper 30.

Each weight acquisition unit 40 includes primarily a sensor unit 42, and a controller, which is not illustrated.

As illustrated in FIG. 4, each gripper 30 is attached to the movable member 20 via a sensor unit 42. While not illustrated, the sensor unit 42 includes a force sensor and an acceleration sensor. Although the type of the force sensor and the acceleration sensor are not limited, the force sensor is, for example, a strain-gauge-type load cell and the acceleration sensor is, for example, a strain-gauge-type load cell or a MEMS type compact acceleration sensor.

When the gripper 30 in a state of gripping the article A is moved in accordance with movement of the movable member 20, the controller of the weight acquisition unit 40 acquires the mass of the article A gripped by the gripper 30, on the basis of force and acceleration measured by the sensor unit 42. Specifically, the controller of the weight acquisition unit 40 divides a force measured by the force sensor by the acceleration measured by the acceleration sensor, and thereby acquires the mass of the article A gripped by the gripper 30.

Note that the weight acquisition unit is not limited to a weight acquisition unit 40 that acquires the mass of the article A on the basis of the force and acceleration measured when the gripper 30 moves. The weight acquisition unit may be one that uses a load cell, etc., to acquire the weight of the article A gripped by the gripper 30 in a stationary state.

(2-5) Loading Unit and Loading Unit Driver

The article group A1 is loaded in the loading unit 50. Specifically, the loading unit 50 includes an article group accommodation container 52 in which the articles A (article group A1) are accommodated. In the loading unit 50, the article group A1 is loaded onto a loading surface 52a, which is a bottom surface of the article group accommodation container 52 in this embodiment. The gripper 30 grips some of the articles A from the article group A1 accommodated in the article group accommodation container 52. In the present embodiment, the article group accommodation container 52 is a rectangular parallelepiped container that is open at the top. In the present embodiment, the loading unit 50 is configured such that when the amount of articles A accommodated inside the article group accommodation container 52 decreases, a person or machine can replace an article group accommodation container 52 having a decreased amount of articles A therein with a new article group accommodation container 52 (in which numerous articles A are accommodated). Further, instead of the loading unit 50 being configured such that the article group accommodation container 52 can be replaced, the loading unit 50 may have an article supply mechanism for supplying articles A to the article group accommodation container 52.

The loading unit 50 is moved by the loading unit driver 54 between a first position and a second position. The loading unit driver 54 moves the loading unit 50 using, for example, a motor or fluid pressure device as a driver. The first position is the position at which the gripper 30 grips the articles A of the article group A1 loaded in the loading unit 50. The second position is the position at which the gripper 30 does not grip the articles A from the article group A1 loaded in the loading unit 50. The loading unit driver 54 moves the loading unit 50 in a direction intersecting a direction of movement of the movable member 20, between the first position and the second position. In other words, the loading unit driver 54 moves the loading unit 50 in a direction intersecting the vertical direction, between the first position and the second position. While not limited, in the present embodiment, the loading unit driver 54 moves the loading unit 50 in a horizontal direction between the first position and the second position.

The first position of the loading unit 50 is, specifically, a position directly under the gripper 30. When the loading unit 50 is in the first position, and the movable member 20 is moved by the robot 10 such that the gripper 30 approaches a prescribed position with respect to the loading unit 50, the gripper 30 can grip an article A loaded in the loading unit 50. Moreover, the first position of the loading unit 50 is a position directly above the discharge chute 60.

Meanwhile, the second position of the loading unit 50 is a position separated from directly under the gripper 30. In the present embodiment, the movable member 20 to which the grippers 30 are attached moves only in the vertical direction, and therefore when the loading unit 50 is in the second position, the grippers 30 cannot grip articles A loaded in the loading unit 50. Moreover, the second position of the loading unit 50 is a position separated from directly above the discharge chute 60.

(2-6) Discharge Chute

The discharge chute 60 is a funnel-shaped member. The discharge chute 60 is disposed directly under the grippers 30. Moreover, when the loading unit 50 is positioned at the first position, the discharge chute 60 is disposed directly under the loading unit 50. In other words, the loading unit 50 positioned in the first position is disposed between the grippers 30 and the discharge chute 60. Meanwhile, when the loading unit 50 is positioned at the second position, the loading unit 50 is not disposed between the grippers 30 and the discharge chute 60.

When the grippers 30 release the gripping, the discharge chute 60 discharges the articles A supplied from the grippers 30 to outside the article gripping device 100. Specifically, when the loading unit 50 is positioned at the second position, the discharge chute 60 receives articles A that are dropped when gripping by the grippers 30 is released, and discharges the articles A to outside of the article gripping device 100.

(2-7) Controller

Although not illustrated, the controller 70 has a CPU and memory such as ROM and/or RAM, etc. The controller 70 is electrically connected to the robot 10, the gripping member driving mechanisms 34, the weight acquisition units 40, and the loading unit driver 54 (see FIG. 2). The CPU executes a program stored in memory, and thereby the controller 70, for example, controls the operation of the various constituents of the article gripping device 100 such as the robot 10, the gripping member driving mechanisms 34, and the loading unit driver 54, and performs a combination calculation using the weight values acquired by the weight acquisition units 40 for the articles A. Note that the various functions of the controller 70 need not be realized by software, and may be realized by hardware, or may be realized by cooperation between hardware and software.

(2-7-1) Control of Gripper Driver Operation

Control of the gripping member driving mechanism 34 by the controller 70 is described below.

The controller 70 has, as control modes for the gripping member driving mechanism 34, a first control mode, and a second control mode that is separate from the first control mode.

In the first control mode, the controller 70 controls the gripping member driving mechanism 34, and causes the gripping members 32 to execute a first operation. The first operation is an operation in which the gripping members 32 grip an article A and subsequently release the gripping of the article A. Here, the first operation is a series of operations whereby a plurality of gripping members 32 in mutually separated positions as illustrated in FIG. 5B shift radially inward and move to mutually close positions as illustrated in FIG. 5C, after which the plurality of gripping members 32 return again to the mutually separated positions as illustrated in FIG. 5B.

In the second control mode, the controller 70 controls the gripping member driving mechanism 34, and causes the gripping members 32 to execute a second operation. The second operation is an operation in which the gripping members 32 remove matter adhering to the gripping members 32. The matter adhering to the gripping members 32 is, for example, the article A itself, a sticky substance included in the article A or other materials. For example, if the article A is spaghetti, the matter adhering to the gripping members may be noodles or ingredients and/or spaghetti sauce, etc.

By providing the controller 70 with the second control mode as a control mode of the gripping member driving mechanism 34, effects like that described below are obtained.

The weight acquisition unit 40 corresponding to the gripper 30 acquires, as the weight of the article A, not only the weight of the article A gripped by the gripping members 32, but also the weight of the matter adhering to the gripping members 32. However, the matter adhering to the gripping member is not the article A gripped by the gripping member 32, and therefore even when the gripping members 32 release the gripping of the article A, there is a concern that such matter will not drop from the gripping members 32. As a result, when the weight of such matter adhering to the gripping member 32 increases, there is a concern that a deviation could occur between the weight of the article A discharged from the gripper 30, and the weight of the article A acquired by the weight acquisition unit 40 corresponding to the gripper 30 thereof. Moreover, a state in which matter remains adhered to the gripping members 32 for a long period of time is not preferable from a sanitary perspective. However, in the present embodiment, the controller 70 has a second control mode as a control mode for the gripping member driving mechanism 34, and the gripping members 32 carry out the second operation in which matter adhering to the gripping members 32 is removed, and such a problem can thereby be alleviated.

The second operation of the gripping members 32 is not limited, but is an operation that differs from the first operation. Note that the matter that the first operation and the second operation differs includes a case in which the mode of movement of the gripping members 32 in the first operation and the mode of movement of the gripping members 32 in the second operation differ. The matter that the first operation and the second operation differs also includes a case in which the modes of movement of the gripping members 32 are the same in the first and second operations, but either the operating speed or the number of executions of the operation of the gripping members 32 differs between the first operation and the second operation.

A specific example of the second operation of the gripping members 32 is described below. Note that the aspect of the second operation of the gripping members 32 given as one example described below may be combined, as appropriate, with an aspect of the second operation according to another example insofar as said aspects are not mutually contradictory. Furthermore, the timing at which the controller 70 controls the gripping member driving mechanism 34 in the second control mode is described separately below.

(a) First Example of the Second Operation of the Gripping Members

To simplify the description below, the positions of the plurality of gripping members 32 depicted in FIG. 5B are referred to as distant positions, and the positions of the plurality of gripping members 32 depicted in FIG. 5C are referred to as close positions.

The second operation of the gripping members 32 according to a first example is a series of operations in which, similar to the first operation, the plurality of gripping members 32 that are mutually separated and disposed at distant positions as in FIG. 5B, are shifted radially inward and moved to close positions as illustrated in FIG. 5C, after which the gripping members 32 are returned again to the distant positions.

However, during the second operation, the average operating speed (hereinafter, referred to as an approaching speed) at which the gripping members 32 move from the distant positions to the close positions is faster than the approaching speed during the first operation. Additionally, or alternatively, the average operating speed (hereinafter, referred to as a separating speed) at which the gripping members 32 move from the close positions to the distant positions during the second operation is faster than the separating speed during the first operation. In other words, during the second operation, movement of the gripping members 32 from the distant positions to the close positions, and/or movement of the gripping members 32 from the close positions to the distant positions, is performed in less time than in the first operation. In particular, in the present embodiment, the approaching speed and the separating speed during the second operation are greater than the approaching speed and the separating speed, respectively, during the first operation. For example, the approaching speed and the separating speed of the gripping members 32 during the second operation are two or more times higher (more preferably, five or more times higher) than the approaching speed and the separating speed during the first operation.

Moreover, a maximum acceleration (hereinafter, referred to as an approaching acceleration) of the gripping members 32 when the gripping members are moved from the distant positions to the close positions during the second operation is greater than the approaching acceleration during the first operation. Additionally, or alternatively, a maximum deceleration (absolute value of the negative acceleration when decelerating, referred to hereinafter as an approaching deceleration) of the gripping members 32 when the gripping members 32 are moved from the distant positions to the close positions during the second operation is greater than the approaching deceleration during the first operation.

Additionally, or alternatively, the maximum acceleration (hereinafter, referred to as a separating acceleration) of the gripping members 32 when the gripping members 32 are moved from the close positions to the distant positions during the second operation is greater than the separating acceleration during the first operation. Additionally, or alternatively, a maximum deceleration (absolute value of the negative acceleration when decelerating, referred to hereinafter as a separating deceleration) of the gripping members 32 when the gripping members 32 are moved from the close positions to the distant positions during the second operation is greater than the separating deceleration during the first operation.

For example, the approaching acceleration and the separating acceleration of the gripping members 32 during the second operation are two or more times greater (more preferably, five or more times greater) than the approaching acceleration and the separating acceleration during the first operation. Moreover, the approaching deceleration and the separating deceleration of the gripping members 32 during the second operation are two or more times greater (more preferably five or more times greater) than the approaching deceleration and the separating deceleration during the first operation.

(b) Second Example of the Second Operation of the Gripping Members

The second operation of the gripping members 32 of the second example is a series of operations in which, similar to the first operation, the plurality of gripping members 32 that are mutually separated and disposed at distant positions as in FIG. 5B, are shifted radially inward and moved to close positions as illustrated in FIG. 5C, after which the gripping members 32 are returned again to the distant positions.

However, during the second operation, the number of times that the gripping members 32 are operated to move from the distant positions to the close positions or from the close positions to the distant positions is greater than during the first operation. For example, during the first operation, the series of operations in which the gripping members 32 are moved from the distant positions to the close positions and then again returned to the distant positions is executed one time, whereas during the second operation, the series of operations in which the gripping members are moved from the distant positions to the close positions and then again returned to the distant positions is executed a plurality of times. For example, during the second operation, the gripping members 32 execute the series of operations two or more times (more preferably four or more times).

(c) Third Example of the Second Operation of the Gripping Members

During the second operation, the gripping members 32 need not move in a range between the distant positions and the close positions as in the first operation. For example, the gripping members 32 may move within a narrower range during the second operation than during the first operation. For example, the movement amount of the gripping members 32 during the second operation may be set to ¾ or less (more preferably, ½ or less) of the movement amount of the gripping members 32 during the first operation. Although not limited, the movement amount of the gripping members 32 during the second operation is set, for example, to ⅛ or more of the movement amount of the gripping members 32 during the first operation.

For example, in the second control mode, the controller 70 combines the aspects of the first to third examples described above, and controls the gripping member driving mechanism 34 such that the gripping members 32 move back and forth in a narrow interval a plurality of times at a high speed. Through such control by the controller 70, the gripping members 32 oscillate at a high speed. Furthermore, by causing the gripping members 32 to undergo such an operation, removal of adhered matter adhered to the gripping members 32 is more easily facilitated.

Note that the aspects of the first to third examples of the second operation described above need not all be simultaneously combined, and need only be combined as appropriate. For example, in another embodiment, the controller 70 may control the gripping member driving mechanism 34 in the second control mode such that the gripping members 32 perform the same motion as that of the first operation (motion of moving from the distant positions to the close positions, and then again returning to the distant positions) only once at a high speed.

(2-7-2) Operation of the Article Gripping Device

Operation of the article gripping device 100 controlled by the controller 70 will be described with reference to FIGS. 6A to 6K and FIG. 7. FIGS. 6A to 6K are schematic side views of the main portion of the article gripping device 100 for explaining the operation of the article gripping device 100 of FIG. 1. In FIGS. 6A to 6K, depiction of the robot 10 that moves the movable member 20 is omitted. FIG. 7 is a flowchart for explaining the operation of the article gripping device 100.

Figure 6A:
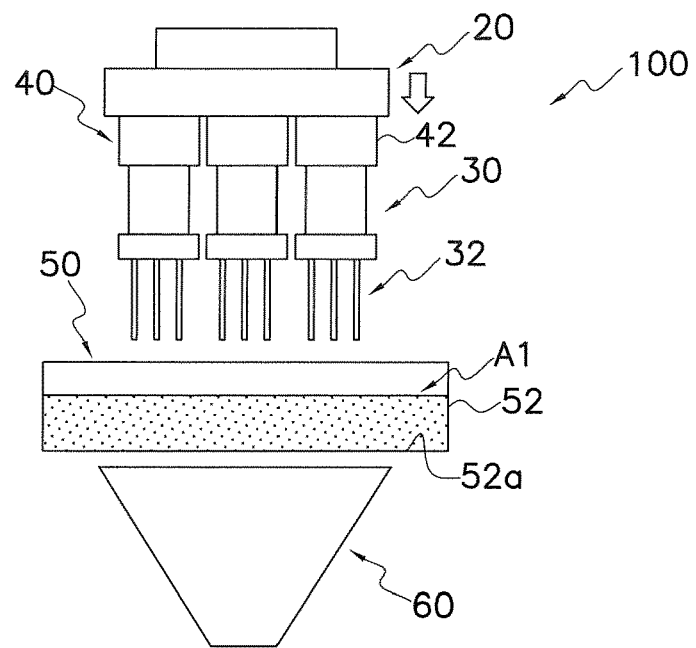
FIG. 6A is a schematic side view of a main portion of the article gripping device of FIG. 1, for explaining the operation of the article gripping device, and depicts a state (initial state) before the gripper grips an article.
Figure 7:
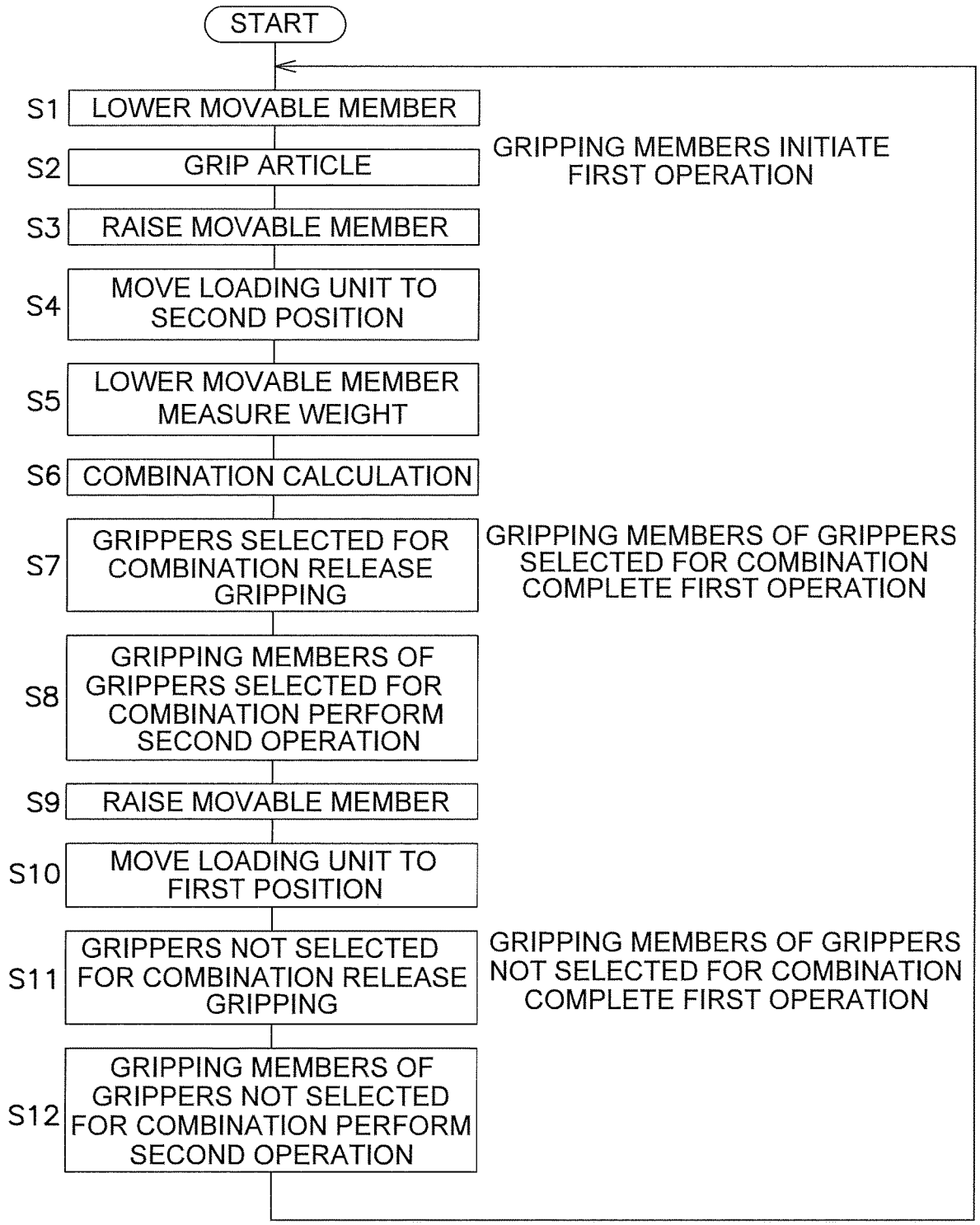
FIG. 7 is a flowchart for explaining the operation of the article gripping device of FIG. 1.

FIG. 6A depicts an initial state before the grippers 30 grip the articles A. The state of each constituent member in the initial state is briefly described. The movable member 20 is disposed at a prescribed position such that the gripping members 32 of the grippers 30 are disposed outside of the article group accommodation container 52 of the loading unit 50. The loading unit 50 is disposed at a first position directly under the grippers 30. The gripping members 32 of each gripper 30 are disposed at the distant positions as in FIG. 5B.

During operation of the article gripping device 100, the controller 70 controls the robot 10 to move the movable member 20 vertically downward and bring the plurality of grippers 30 close to the loading unit 50 from the initial state (step S1 in FIG. 7). Specifically, the controller 70 controls the operation of the robot 10 to move the movable member 20 vertically downward so that the gripping members 32 of the grippers 30 are disposed at a prescribed position enabling gripping of the articles A inside the article group accommodation container 52 (see FIG. 6B). More specifically, the controller 70 controls the operation of the robot 10 to move the movable member 20 vertically downward so that the gripping members 32 are at least partially inserted into the article group A1.

Next, in step S2, the controller 70 controls the gripping member driving mechanism 34 of each gripper 30, and causes the gripping members 32 to grip the articles A. Preferably, the controller 70 causes a plurality of grippers 30 to simultaneously grip articles A. However, the present invention is not limited to this configuration, and the controller 70 may cause the plurality of grippers 30 to grip articles A at different timings.

Next, with the plurality of grippers 30 gripping articles A, the controller 70 controls the robot 10 to move the movable member 20 vertically upward such that the gripping members 32 of the grippers 30 are disposed outside of the article group accommodation container 52 of the loading unit 50 (see FIG. 6C and step S3 of FIG. 7).

Next, the controller 70 controls the loading unit driver 54 to move the loading unit 50 from the first position to the second position (see FIG. 6D and step S4 of FIG. 7). Movement of the loading unit 50 to the second position brings about a state in which the loading unit 50 is not disposed between the grippers 30 and the discharge chute 60.

Figure 6B:
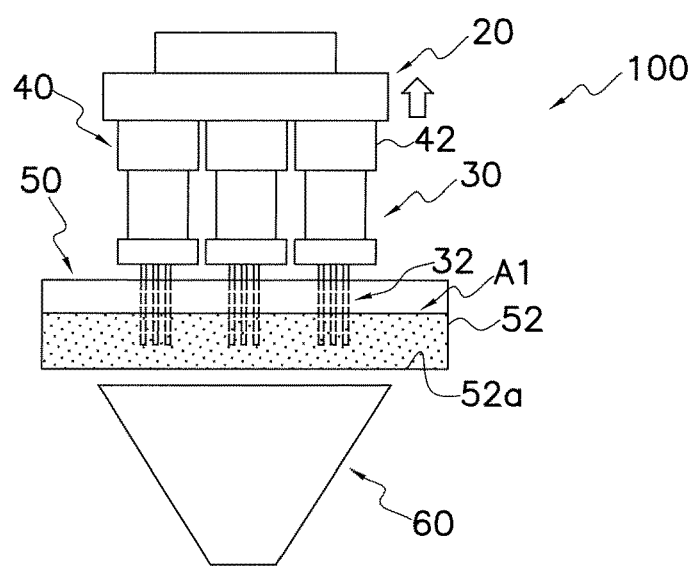
FIG. 6B is a schematic side view of the main portion of the article gripping device of FIG. 1, for explaining the operation of the article gripping device, and depicts a state in which the gripping members of the grippers are inserted into an article group in order to grip the articles.
Figure 6E:
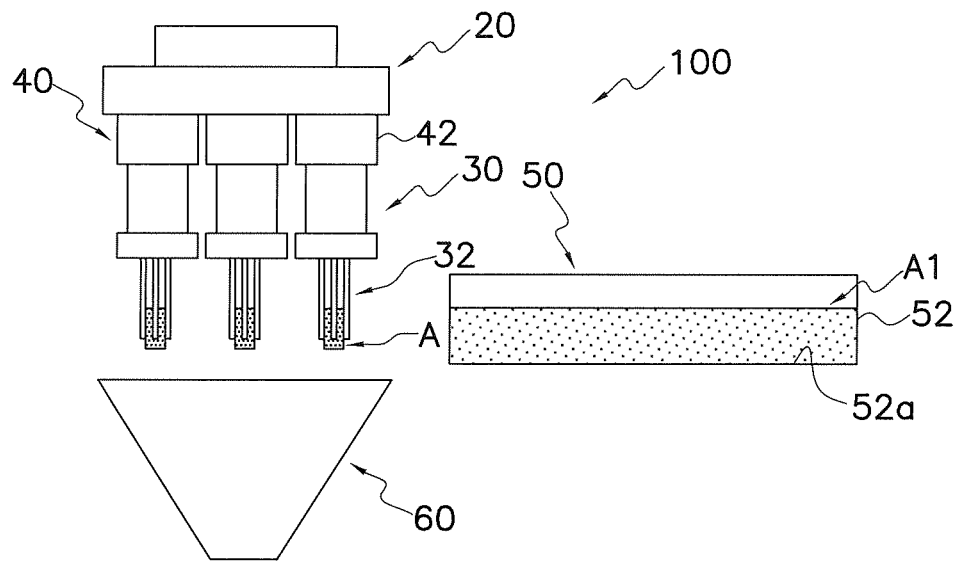
FIG. 6E is a schematic side view of the main portion of the article gripping device of FIG. 1, for explaining the operation of the article gripping device and depicts a state in which the grippers have been moved to a vicinity of a chute for discharging the articles.

Next, the controller 70 controls the robot 10 to move the movable member 20 vertically downward and bring the plurality of grippers 30 close to the discharge chute 60 (see FIG. 6E). When the robot 10 moves the movable member 20 vertically downward, each weight acquisition unit 40 acquires the weight of the articles A gripped by the corresponding gripper 30 (see step S5 of FIG. 7). The controller 70 performs a combination calculation using the weight values of the articles A gripped by each gripper 30, the weight values being acquired from each weight acquisition unit 40, and finds a combination of weight values for which the total value thereof is within a target weight range (see step S6 of FIG. 7).

Figure 6F:
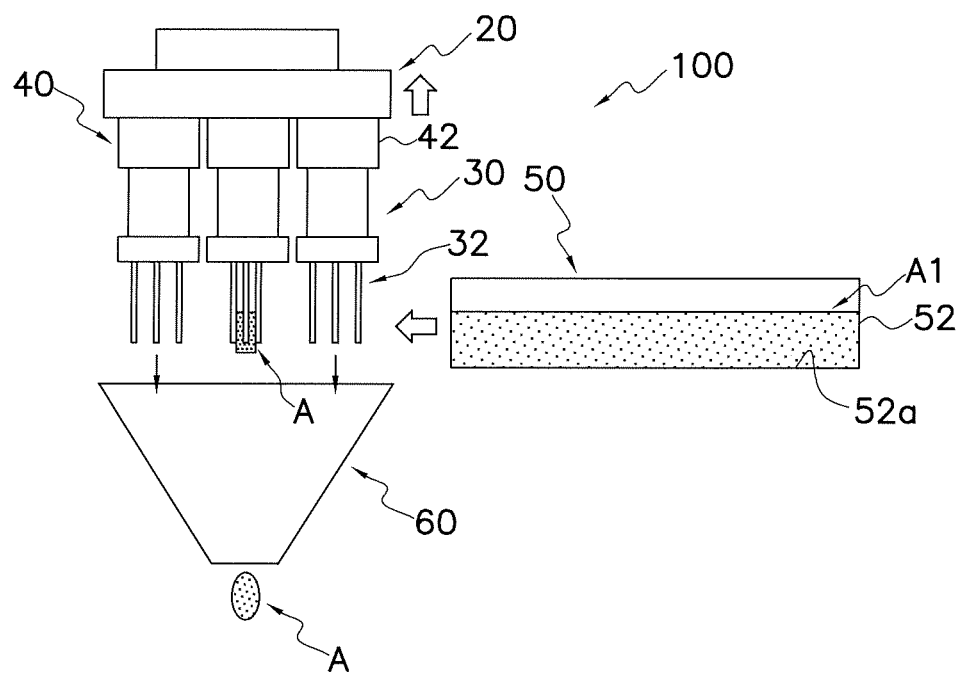
FIG. 6F is a schematic side view of the main portion of the article gripping device of FIG. 1, for explaining the operation of the article gripping device, and depicts a state in which some of the grippers have dropped articles into the chute.

When the combination calculation is completed, on the basis of the result of the combination calculation, the controller 70 causes the grippers 30 corresponding to the combination of weight values that is in the target weight range to release gripping of the articles A above the discharge chute 60, and the articles A are discharged from the discharge chute 60 (see FIG. 6F and step S7 of FIG. 7). The first operation is completed at this time for the gripping members 32 of the grippers 30 selected for the combination.

Next, immediately after gripping of the articles A has been released in the first operation by the gripping members 32 of the grippers 30 caused to release the gripping of the articles A, the controller 70 controls the gripping member driving mechanisms 34 of said grippers 30 (the grippers 30 that release the gripping of the articles A), and causes the gripping members 32 of said grippers 30 to execute the second operation. For example, the controller 70 controls the gripping member driving mechanisms 34 so that the gripping members 32 move a plurality of times at a high speed between the distant positions (see FIG. 6H) and the close positions (see FIG. 6G). Note that as described above, various operations can be used as the second operation of the gripping members 32.

When there are a plurality of combinations of weight values that are in the target weight range, step S7 and step S8 of FIG. 7 are performed for each combination. In other words, when there are a plurality of combinations of weight values that are in the target weight range, step S7 and step S8 of FIG. 7 are performed a plurality of times with different grippers 30.

When the discharge of articles A is ended for all combinations of weight values that are in the target weight range, the controller 70 controls the robot 10 to return the movable member 20 to the same position as the position depicted in FIG. 6A (see step S9 of FIG. 7). The controller 70 also controls the loading unit driver 54 to return the loading unit 50 from the second position to the first position directly under the grippers 30 (see FIG. 6I and step S10 of FIG. 7). Furthermore, if there is a gripper 30 that is still gripping an article A, the controller 70 controls the gripping member driving mechanism 34 of that gripper 30 to cause that gripper 30 to release gripping of the article A (see FIG. 6I and step S11 of FIG. 7). In other words, if there is a gripper 30 for which the weight of the article A gripped thereby was not selected for the combination, the controller 70 controls the gripping member driving mechanism 34 of that gripper 30 to cause that gripper 30 to release gripping of the article A. The article A gripped by the gripper 30 is then dropped into the loading unit 50 disposed at the first position, and is reused as an article A of the article group A1. At this time, the first operation is completed for the gripping members 32 of grippers 30 not selected for the combination.

Next, immediately after gripping of the articles A has been released in the first operation in step S11 by the gripping members 32 of the grippers 30 caused to release the gripping of the articles A, the controller 70 controls the gripping member driving mechanisms 34 of said grippers 30 (the grippers 30 that release the gripping of the articles A) to cause the gripping members 32 of said grippers 30 to execute the second operation (see step S12 of FIG. 7). Here, gripping members 32 that have carried out the second operation subsequently again perform the first operation immediately in the next cycle. Therefore, before causing the gripping members 32 to grip articles A in the first operation, the controller 70 controls the gripping member driving mechanisms 34 in the second control mode to cause the gripping members 32 to execute the second operation. Note that as described above, various operations can be used as the second operation of the gripping members 32.

After the execution of step S12, the process returns to step S1, and the article gripping device 100 repeatedly performs the above operations.

The operation of the article gripping device 100 explained here is merely one example, and can be changed, as appropriate, insofar as such change is not contradictory.

For example, in the explanation above, each weight acquisition unit 40 acquires the weight of the articles A gripped by the gripper 30 at the timing at which the movable member 20 is moved vertically downward. Alternatively, each weight acquisition unit 40 may acquire the weight of the articles A gripped by the corresponding gripper 30 at the timing at which the movable member 20 is moved vertically upward.

Moreover, for example, when the controller 70 controls the robot 10 in a state in which the plurality of grippers 30 are gripping the articles A to cause the movable member 20 to move upward from the position depicted in FIG. 6B to the position depicted in FIG. 6C, the controller 70 may control the robot 10 such that the movable member 20 is moved downward one or more times before the loading unit 50 is moved from the first position to the second position. Specifically, the controller 70 may control the robot 10 such that the movable member 20 is moved only once a prescribed distance downward after the movable member 20 has been moved upward and before the loading unit 50 is moved from the first position to the second position. The controller 70 may also, for example, control the robot 10 such that after the movable member 20 has been moved upward, and before the loading unit 50 is moved from the first position to the second position, the movable member 20 is moved reciprocally upward and then downward. Through such operation of the movable member 20, articles adhering to the gripping members 32 can be shaken off. Articles adhering to the gripping members 32 are articles that are not gripped by the gripping members 32 and that are likely to drop regardless of operation of the gripping members 32. By moving the movable member 20 downward to shake off, in advance, articles adhering to the gripping members 32, it is possible to make the weight of the articles A acquired by the weight acquisition unit 40 approach the weight of the articles A gripped by the gripping members 32, and thereby improve the weighing precision.

(3) Features (3-1)

The article gripping device 100 of the present embodiment causes the gripping members 32 to grip articles A, and subsequently discharges the articles A by causing the gripping members 32 to release the gripping of the articles A. The article gripping device 100 is provided with the gripping member driving mechanism 34 as one example of a driving mechanism, and the controller 70. The gripping member driving mechanism 34 drives the gripping members 32. The controller 70 controls the gripping member driving mechanism 34. The controller 70 has, as control modes for the gripping member driving mechanism 34, the first control mode, and the second control mode that is separate from the first control mode. In the first control mode, the controller 70 controls the gripping member driving mechanism 34 to cause the gripping members 32 to execute the first operation of gripping articles A and subsequently releasing the gripping of the articles A. In the second control mode, the controller 70 controls the gripping member driving mechanism 34 to cause the gripping members 32 to execute the second operation of removing matter adhering to the gripping members 32.

In the article gripping device 100 of the present embodiment, the second operation of the gripping members 32 reduces the occurrence of a state in which matter remains adhered to the gripping members 32, without stopping the device for maintenance, and thus the article gripping device 100 is sanitary.

Here, a gripping member driving mechanism 34 that causes the gripping members 32 to grip the articles A and release gripping of the articles A is also used to cause the gripping members 32 to execute the second operation. Therefore, in this article gripping device 100, the number of components can be reduced and the device can be simplified relative to a case in which a separate mechanism is provided to cause the gripping members 32 to execute the second operation.

(3-2)

The article gripping device 100 of the present embodiment is provided with the weight acquisition unit 40. The weight acquisition unit 40 acquires a weight value of the articles A gripped by the gripping members 32.

In the article gripping device 100 of the present invention, a state in which articles A is kept to be adhered to the gripping members 32 and/or a state in which the articles A adhering to the gripping members 32 are dropped at an unintended timing is not prone to occur. Therefore, in this article gripping device 100, deviation between the weight of the articles A to be discharged and the weight value acquired by the weight acquisition unit 40 is likely to be reduced.

(3-3)

In the article gripping device 100 of the present embodiment, the second operation differs from the first operation.

In the article gripping device 100 of the present embodiment, the gripping members 32 perform a second operation that differs from the normal first operation and is suited for removal of matter, and removal of matter adhering to the gripping members 32 can be thereby facilitated.

Insofar as removal of matter adhering to the gripping members 32 can be facilitated, the second operation may be an operation that is identical to the first operation (in other words, an operation in which the mode of shifting of the gripping member 32 is the same as that of the first operation, and the operating speed of the gripping members 32 and the number of executions of the operation are the same as those of the first operation).

(3-4)

In the article gripping device 100 of the present embodiment, preferably, the average operating speed of the gripping members 32 during the second operation is greater than the average operating speed of the gripping members 32 during the first operation. More specifically, the approaching speed and/or separating speed of the gripping members 32 during the second operation is greater than the approaching speed and/or separating speed during the first operation.

In the article gripping device 100 of the present embodiment, the gripping members 32 perform a second operation having a higher speed than the normal first operation, and removal of matter adhering to the gripping members 32 can be thereby facilitated.

(3-5)

In the article gripping device 100 of the present embodiment, the controller 70 controls the gripping member driving mechanism 34 in the second control mode immediately after causing the gripping members 32 to release gripping of the articles A in the first operation.

In the article gripping device 100 of the present embodiment, the gripping members 32 perform the second operation immediately after gripping of the articles A is released, and therefore all or a majority of the articles A gripped by the gripping members 32 are easily discharged.

(3-6)

In the article gripping device 100 of the present embodiment, the controller 70 controls the gripping member driving mechanism 34 in the second control mode before causing the gripping members 32 to grip the articles A in the first operation.

In the article gripping device 100 of the present embodiment, the gripping members 32 perform the second operation before gripping the articles A, and therefore matter adhering to the gripping members 32 can be removed or reduced before the articles A are gripped.

(3-7)

In the article gripping device 100 of the present embodiment, the controller 70 periodically executes control of the gripping member driving mechanism 34 in the second control mode. In the present embodiment, each time the gripping members 32 release the gripping of the articles A in the first operation, the controller 70 executes control of the gripping member driving mechanism 34 in the second control mode.

In the article gripping device 100 of the present embodiment, the second control mode is periodically executed, and therefore prolonged adhesion of matter to the gripping members 32 is reduced, and the article gripping device 100 is sanitary.

(4) Modifications

Modifications of the abovementioned embodiment are presented below. Note that some or all of the details of each modification may be combined with the details of the abovementioned embodiment and/or the details of other modifications insofar as such details are not mutually contradictory.

(4-1) Modification A

The type of gripper used in the embodiment above is merely one example, and various types of grippers can be applied as the grippers of the present disclosure. For example, grippers that grip articles A by being moved in parallel such that a pair of gripping members is drawn mutually close together may be used.

Moreover, in the abovementioned embodiment, the same types of grippers 30 are attached to the movable member 20. However, the present invention is not limited to this configuration, and two or more types of grippers 30 may be attached to the movable member 20.

(4-2) Modification B

In the abovementioned embodiment, the gripping members 32 perform the second operation immediately after releasing the gripping of the articles A. However, the timing at which the gripping members 32 perform the second operation is not limited to immediately after release of gripping of the articles A.

Figure 8:
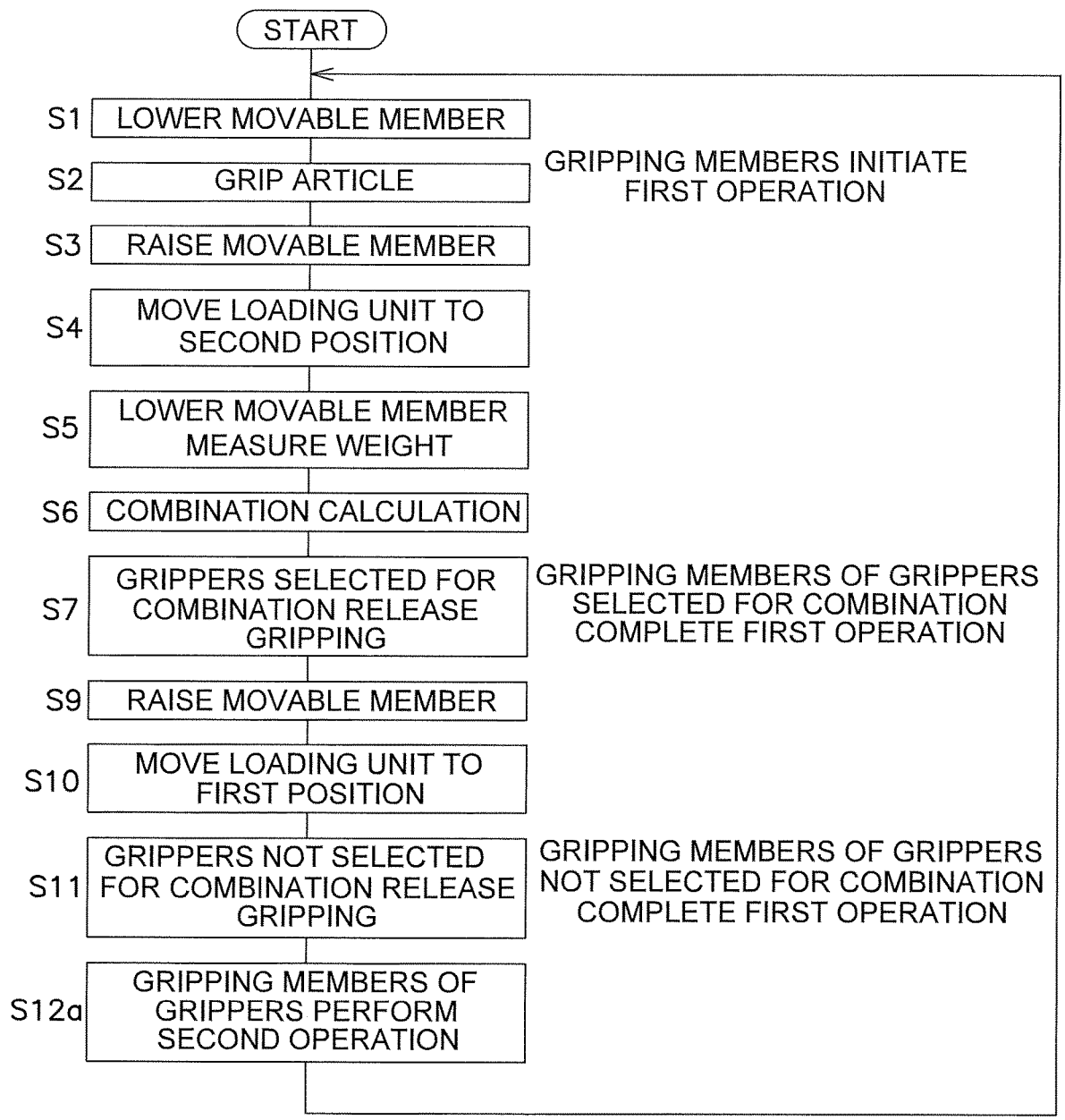
FIG. 8 is a flowchart for explaining the operation of an article gripping device according to a modification B.

For example, as in the flowchart presented in FIG. 8, gripping members 32 that released gripping of the articles A in step S7 need not execute the second operation immediately thereafter. In other words, step S8 in the flowchart of FIG. 7 may be omitted. In the flowchart presented in FIG. 8, after the gripping members 32 of the grippers 30 not selected for the combination have released gripping of the articles A in step S11, the controller 70 may control all of the gripping member driving mechanisms 34 to cause the gripping members 32 of all of the grippers 30 to execute the second operation (see step S12a of FIG. 8). In other words, the controller 70 may control the gripping member driving mechanisms 34 in the second control mode before causing the gripping members 32 to grip the articles A (in particular, immediately before causing the gripping members 32 to grip the articles A) in the first operation.

(4-3) Modification C

In the abovementioned embodiment and/or in modification B, the controller 70 executes control of the gripping member driving mechanisms 34 through the second control mode each time the gripping members 32 release the gripping of the articles A in the first operation. However, the present invention is not limited to this configuration.

Figure 9:
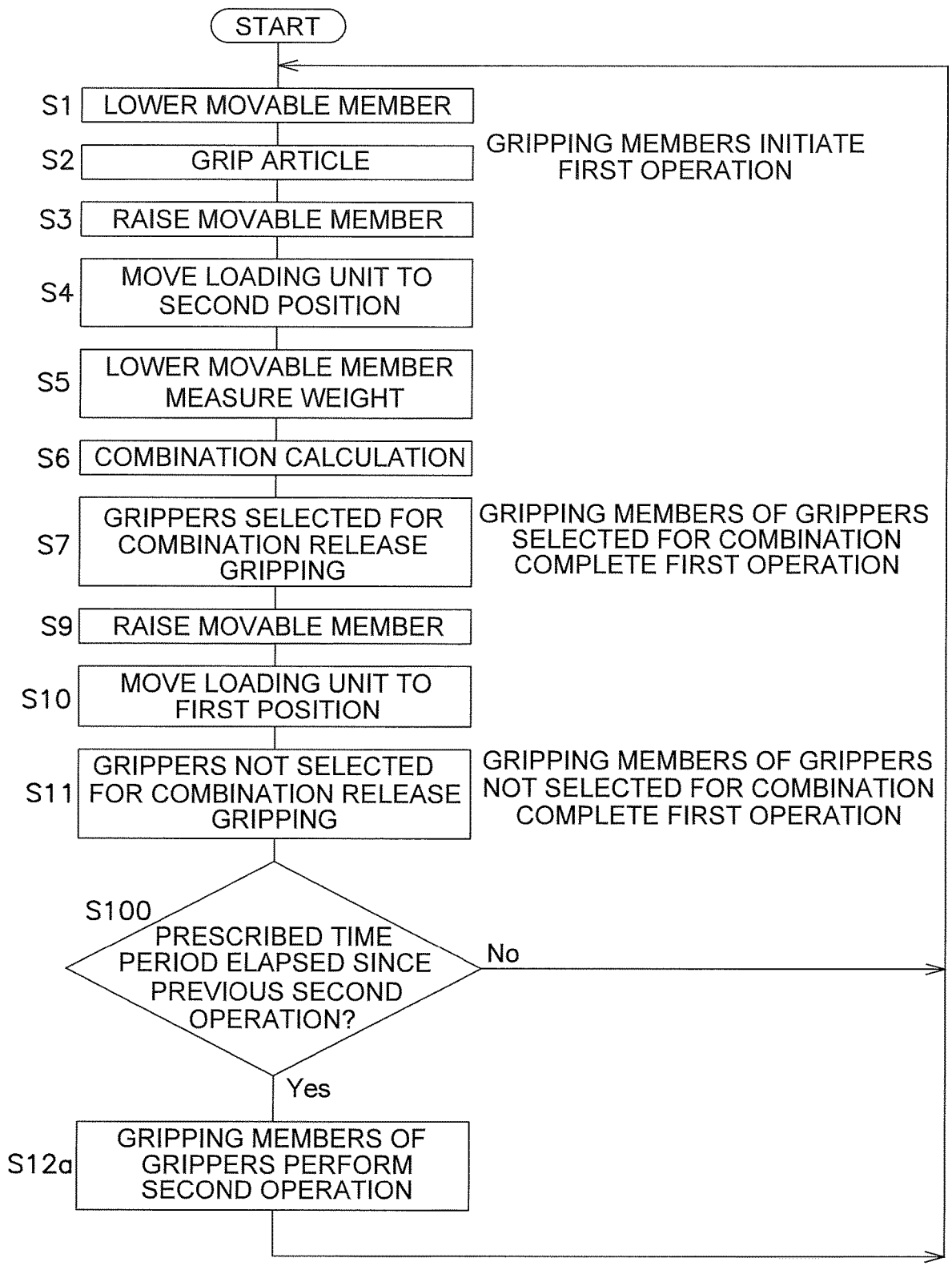
FIG. 9 is a flowchart for explaining the operation of an article gripping device according to a modification C.

For example, the article gripping device 100 may operate according to the flowchart presented in FIG. 9, in which a portion of the flowchart of FIG. 8 is further changed.

In the flowchart of FIG. 9, after the gripping members 32 of grippers 30 not selected for the combination have released the gripping of articles A in step S11, a determination is made regarding whether a prescribed time period has elapsed since the gripping members 32 executed the previous second operation (see step S100). For example, in step S100, a determination is made regarding whether a prescribed amount of time (10 minutes for example) has elapsed since the previous second operation was executed. In step S100, a determination may be made regarding whether the number of times that the first operation has been executed by the gripping members 32 of the grippers 30 since the previous second operation was executed has reached a prescribed number of times (20 times, for example). Furthermore, when it is determined that the prescribed time period since the gripping members 32 executed the previous second operation has not elapsed, the process returns to step S1. Meanwhile, when it is determined that the prescribed time period since the gripping members 32 executed the previous second operation has elapsed, the controller 70 executes control of the gripping member driving mechanisms 34 through the second control mode (see step S12a of FIG. 9). In this manner, the second control mode is periodically executed, and prolonged adhesion of matter to the gripping members 32 is thereby suppressed, and the article gripping device 100 is sanitary.

The controller 70 may also execute control of the gripping member driving mechanisms 34 through the second control mode when a user instructs control of the gripping member driving mechanisms 34 in the second control mode through use of an operating unit (not illustrated) of the article gripping device 100 (a flowchart is omitted). In other words, the controller 70 may execute control of the gripping member driving mechanisms 34 through the second control mode in an unscheduled manner.

(4-4) Modification D

In the abovementioned embodiment, the loading unit driver 54 moves the loading unit 50 between the first position and the second position. However, the present invention is not limited to such an aspect, and the loading unit 50 may be immobile.

In this case, preferably, the discharge chute 60 is disposed at a location other than directly under the loading unit 50, and the movable member 20 is movable not only in the vertical direction, but also in the horizontal direction. Through this configuration, after the articles A of the loading unit 50 are gripped by the grippers 30, the movable member 20 is shifted to shift the grippers 30 to above the discharge chute 60, and the articles A can then be discharged by releasing the gripping of the articles A by the grippers 30 above the discharge chute 60.

(4-5) Modification E

In the abovementioned embodiment, the article gripping device 100 controls the operation of the gripping members 32 of a plurality of grippers 30 attached to the movable member 20, some articles A of the article group A1 are gripped by each of the grippers 30, and the weight value of the articles A gripped by each gripper 30 is acquired by the weight acquisition unit 40. The controller 70 then performs a combination calculation on the basis of the weight values of the articles A gripped by each of the grippers 30, the weight values being acquired by the weight acquisition units 40.

Figure 10:
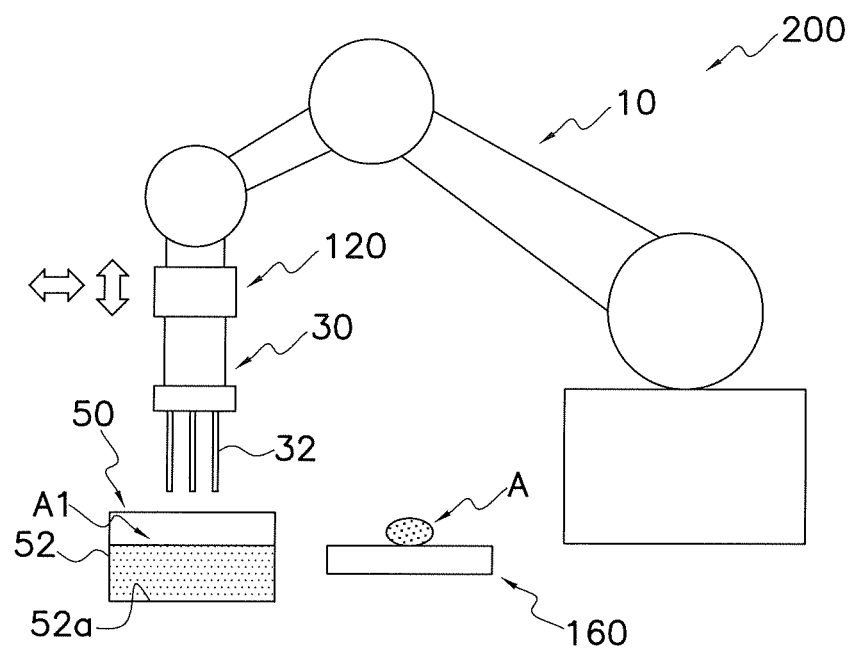
FIG. 10 is a schematic view of an article gripping device according to a modification E.

However, the article gripping device is not limited to such an aspect, and an article gripping device 200 may be configured as in FIG. 10. In FIG. 10, members having the same configuration as the embodiment described above are assigned the same reference numeral.

In the article gripping device 200 of modification E illustrated in FIG. 10, a movable member 120 supports a single gripper 30. In the article gripping device 200, the robot 10 moves the movable member 120 not only in the vertical direction, but also in the horizontal direction. As illustrated in FIG. 10, the article gripping device 200 does not have a weight acquisition unit 40. Furthermore, as also illustrated in FIG. 10, the article gripping device 200 does not have a discharge chute 60, but has, in place of the discharge chute 60, a conveyor 160 for conveying the articles A or a container (not illustrated) into which the articles A are filled. The article gripping device 200 causes the gripper 30 to grip some of the articles A of the article group A1 (a prescribed amount of articles A) loaded in the loading unit 50, and moves the gripper 30 to above the conveyor 160 without measuring the weight of the articles A. Gripping of the articles A by the gripping members 32 is then released, and the articles A are dropped onto the conveyor 160 or into a container (not illustrated) that is conveyed by the conveyor 160.

In the article gripping device 200 configured in this manner as well, the controller 70 controls the gripping member driving mechanism 34 in the second control mode, and causes the gripping members 32 to execute the second operation. For example, the controller 70 preferably causes the gripping members 32 to execute the second operation when the gripper 30 is disposed above the article group accommodation container 52 or above the conveyor 160. Through this configuration, the gripper 30 can easily control the amount of articles A that are moved from the loading unit 50 to the conveyor 160 to a prescribed amount. It is also possible to suppress a condition in which matter adhering to the gripping members remains on the gripping members 32 for a long time, and such a configuration therefore excels from a sanitary perspective.

(4-6) Modification F

In the embodiment described above, the robot 10 moves the movable member 20 along a single axis. However, the present invention is not limited to such an aspect, and the robot 10 may move the movable member 20 in a plurality of directions. For example, when moving the movable member 20 upward from the position depicted in FIG. 6B to the position depicted in FIG. 6C, the robot 10 may move the movable member 20 back and forth in a horizontal direction orthogonal to the vertical direction so as to shake off any articles A adhering to the gripping members 32.

(4-7) Modification G

Figure 11:
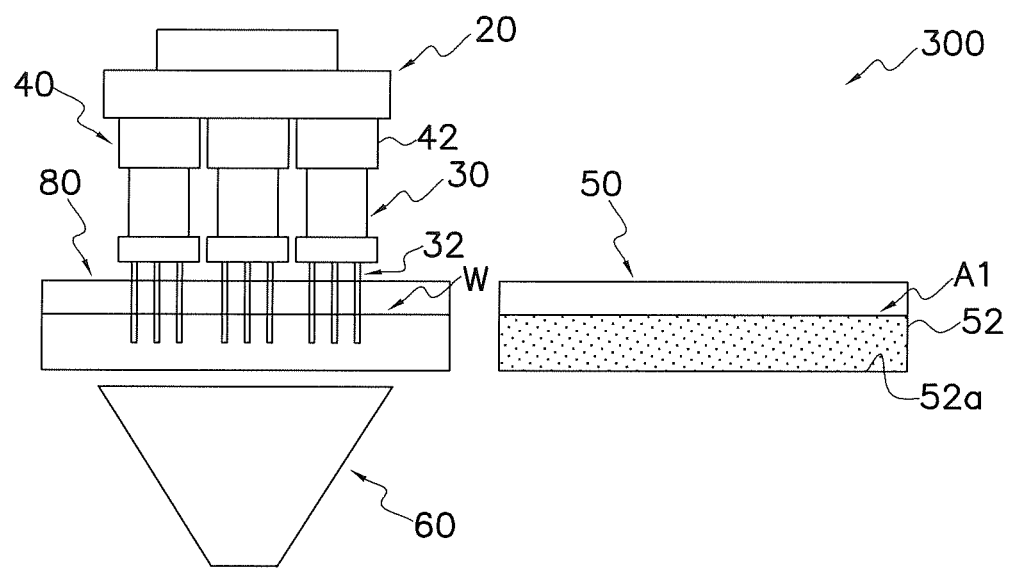
FIG. 11 is a schematic side view of a main portion of an article gripping device according to a modification G.

In addition to the configuration of the article gripping device 100 of the embodiment described above, the article gripping device may also have a storage container 80 for storing a cleaning liquid W, as in an article gripping device 300 depicted in FIG. 11. The liquid W is not limited, and may be water, for example. In the article gripping device 300, the second operation of the gripping members 32 is executed in a state in which the gripping members 32 are at least partially inserted into the liquid W in the storage container 80 as in FIG. 11.

In the article gripping device 300, the second operation of the gripping members 32 is executed in accordance with, for example, an aspect like that described below. The article gripping device 300 is identical to the article gripping device 100 of the embodiment described above with the exception of the following two points.

Figure 12:
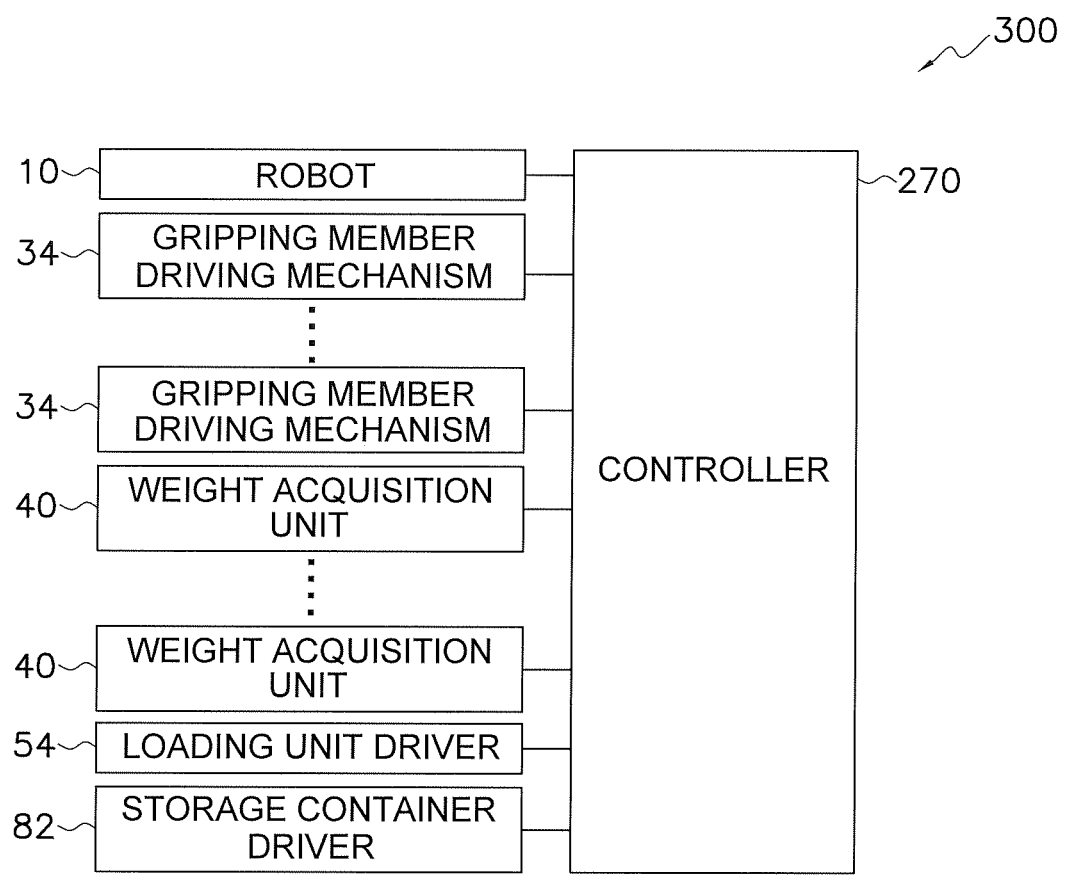
FIG. 12 is a block diagram of the article gripping device of FIG. 11.

1) The article gripping device 300 has a storage container 80 and a storage container driver 82 (see FIG. 12) for driving the storage container 80.

2) Operation of the article gripping device 300 that is controlled by a controller 270 (see FIG. 12) of the article gripping device 300 partially differs from the operation of the article gripping device 100.

Here, unless otherwise necessary, explanations of the article gripping device 300 besides the differences with the abovementioned article gripping device 100 are omitted.

As stated above, the article gripping device 300 has a storage container driver 82 for moving the storage container 80. The storage container driver 82 moves the storage container 80 between a standby position and a cleaning position. The storage container driver 82 moves the storage container 80 using, for example, a motor and/or fluid pressure device as a driver. The cleaning position of the storage container 80 is a position directly under the grippers 30. The standby position of the storage container 80 is a position that is separated from directly under the grippers 30. Although this configuration is not limiting, the storage container driver 82 in the present embodiment moves the storage container 80 horizontally between the standby position and the cleaning position.

The operation of the article gripping device 300 controlled by the controller 270 will be described with reference to the flowchart of FIG. 13.

Steps S1 to S7, steps S9 to S11, and step S100 are the same as the control of the operation of the article gripping device 100 by the controller 70 in modification C described above. Therefore, in order to avoid a duplication of descriptions, the descriptions of steps S1 to S7, steps S9 to S11, and step S100 are omitted.

Figure 13:
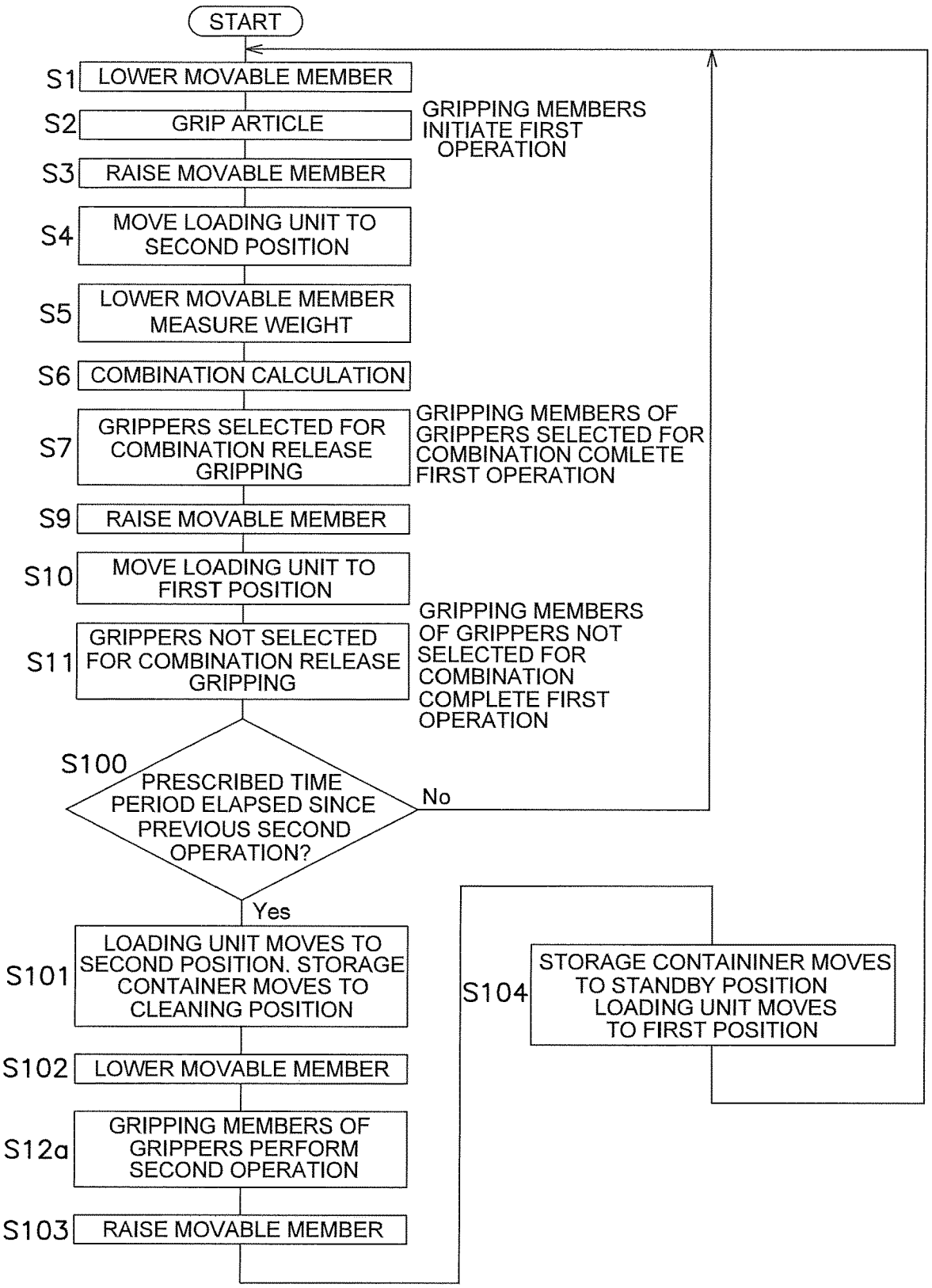
FIG. 13 is a flowchart for explaining the operation of the article gripping device of FIG. 11.

When the determination in step S100 is Yes, the process advances to step S101, and when the determination is No, the process returns to step S1 (see FIG. 13).

In step S101, the controller 270 controls the loading unit driver 54 to move the loading unit 50 from the first position to the second position. Also in step S101, the controller 270 controls the storage container driver 82 to move the storage container 80 from the standby position to the cleaning position.

In step S102, the controller 270 controls the operation of the robot 10 to move the movable member 20 vertically downward such that the gripping members 32 of the grippers 30 are disposed at least partially in the liquid W of the storage container 80.

With the gripping members 32 disposed at least partially in the liquid W of the storage container 80, the controller 270 controls all of the gripping member driving mechanisms 34 to cause the gripping members 32 of all of the grippers 30 to execute a second operation (step S12a of FIG. 13). As described above, various operations can be used as the second operation of the gripping members 32.

Next, in step S103, the controller 270 controls the operation of the robot 10 to move the movable member 20 vertically upward (to the initial state position illustrated in FIG. 6A) such that the gripping members 32 of the grippers 30 are disposed outside of the storage container 80.

In step S104, the controller 270 controls the storage container driver 82 to move the storage container 80 from the cleaning position to the standby position. The controller 270 also controls the loading unit driver 54 to move the loading unit 50 from the second position to the first position. The process then returns to step S1.

The configuration of modification G may be changed as appropriate.

For example, when the storage container 80 is disposed further upward than the article group accommodation container 52 of the loading unit 50, the loading unit 50 need not be moved in step S102 and step S104.

Moreover, in modification G, the storage container 80 moves between the standby position and the cleaning position, but the storage container 80 may be immobile. Alternatively, the robot 10 may move the movable member 20 at a prescribed timing such that the gripping members 32 are disposed at least partially in the liquid W of the storage container 80.

The operation of the article gripping device 100 of the abovementioned embodiment, and the operation of the article gripping device 300 of modification G may also be combined. For example, as in the flowchart of FIG. 7, each time the gripping members 32 release the gripping of the articles A in the first operation, the controller 270 executes control of the gripping member driving mechanism 34 through the second control mode with the gripping members 32 disposed mid-air (not inserted into the liquid W). When a prescribed time period has elapsed since the gripping members 32 executed the previous second operation in the liquid W, the controller 270 may cause the gripping members 32 to execute the second operation with the gripping members 32 inserted at least partially into the liquid in the storage container 80.

(4-8) Modification H

In the embodiment described above, the details of the second operation executed by the gripping members 32 are the same each time, but the present invention is not limited to this configuration. The article gripping device 100 may be configured such that the second operation that is executed by the gripping members 32 changes.

For example, the second operation executed by the gripping members 32 may include a normal operation and a special operation that takes more time (the time during which the gripping members 32 are shifted is longer) than the normal operation. The controller 70 may control the gripping member driving mechanisms 34 such that the gripping members 32 are caused to execute the normal operation as the second operation. Further the controller 70 may control the gripping member driving mechanisms 34, every time when the normal operation are executed by a prescribed number of times, such that the gripping members 32 are caused to execute a special operation one time as the second operation.

(4-9) Modification I

In the embodiment described above, the article gripping device 100 has one movable member 20 and one robot 10, but the present invention is not limited to this configuration. The article gripping device 100 may have a plurality of movable members 20 to which grippers 30 are attached, and may have a plurality of robots 10 that move the movable members 20.

(4-10) Modification J

The article gripping device 100 may have a matter removal mechanism for removing matter adhering to the gripping members 32. For example, the article gripping device 100 may have, as matter removal mechanism, an air blowing mechanism that blows air onto the gripping members 32. Moreover, the article gripping device 100 may have, as a matter removal mechanism, a scrape-off mechanism having a contact member that contacts the gripping members 32, and a driver that shifts the contact member to scrape off matter adhering to the gripping members 32. Removal of matter adhering to the gripping members 32 can be facilitated by providing the article gripping device 100 with these matter removal mechanisms in addition to the second operation of the gripping members 32.

(4-11) Modification K

In the embodiment described above, the movable member 20 to which the grippers 30 are attached is moved to thereby move the gripping members 32 of the grippers 30 to a position at which articles A of the article group A1 loaded in the loading unit 50 can be gripped. However, the present invention is not limited to this configuration, and the grippers 30 may be fixed to an immovable frame. Furthermore, the loading unit 50 may be configured to also be movable upward and downward, and instead of the grippers 30 moving, the loading unit 50 may be moved to a position at which the gripping members 32 of the grippers 30 can grip the articles A.

<Supplementary Note>

The article gripping devices described above are merely specific examples of article gripping devices, and do not limit the technical scope of the present application. In the above-described embodiments, it should be understood that various modifications can be made without departing from the spirit and scope of the present disclosure.

The invention claimed is:

1. An article gripping device that causes a plurality of gripping members to grip an article, and subsequently discharges the article by causing the plurality of gripping members to release the gripping of the article, the article gripping device comprising:
    a driving mechanism configured to drive the plurality of gripping members; and
    a controller configured to control the driving mechanism; the controller having, as control modes for the driving mechanism:
    a first control mode to control the driving mechanism to cause the plurality of gripping members to execute a first operation of moving from a separated state to a close state such that in the close state the plurality of gripping members grip the article and subsequently release the article; and
    a second control mode to control the driving mechanism to cause the plurality of gripping members to execute a second operation of removing matter adhering to the plurality of gripping members, the second operation including moving of the plurality of gripping members from the separated state to the close state at an average operating speed that is greater than the average operating speed of moving the plurality of gripping members during the first operation.

2. The article gripping device according to claim 1, further comprising a weight acquisition unit configured to acquire a weight value of the article gripped by the plurality of gripping members.

3. The article gripping device according to claim 2, wherein the controller controls the driving mechanism in the second control mode immediately after causing the plurality of gripping members to release the article in the first operation.

4. The article gripping device according to claim 2, wherein the controller controls the driving mechanism in the second control mode before causing the plurality of gripping members to grip the article in the first operation.

5. The article gripping device according to claim 2, wherein the controller periodically executes control of the driving mechanism in the second control mode.

6. The article gripping device according to claim 2, further comprising a storage container in which a cleaning liquid for cleaning the plurality of gripping members is stored, the second operation of the plurality of gripping members being executed with the plurality of gripping members at least partially inserted into the liquid inside the storage container without articles.

7. The article gripping device according to claim 1, wherein the controller controls the driving mechanism in the second control mode immediately after causing the plurality of gripping members to release the article in the first operation.

8. The article gripping device according to claim 1, wherein the controller controls the driving mechanism in the second control mode before causing the plurality of gripping members to grip the article in the first operation.

9. The article gripping device according to claim 1, wherein the controller periodically executes control of the driving mechanism in the second control mode.

10. The article gripping device according to claim 1, further comprising a storage container in which a cleaning liquid for cleaning the plurality of gripping members is stored, the second operation of the plurality of gripping members being executed with the plurality of gripping members at least partially inserted into the liquid inside the storage container without articles.

\* \* \* \* \*